US011734272B2

(12) United States Patent
Srinivasan et al.

(10) Patent No.: US 11,734,272 B2
(45) Date of Patent: Aug. 22, 2023

(54) PRESCRIPTIVE ANALYTICS BASED NOSQL DATABASE SERVICE OPTIMIZATION SYSTEM FOR CLOUD COMPUTING

(71) Applicant: Accenture Global Solutions Limited, Dublin (IE)

(72) Inventors: Madhan Kumar Srinivasan, Bangalore (IN); Guruprasad Pv, Bangalore (IN); Samba Sivachari Rage, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 642 days.

(21) Appl. No.: 16/896,681

(22) Filed: Jun. 9, 2020

(65) Prior Publication Data
US 2021/0334282 A1 Oct. 28, 2021

(30) Foreign Application Priority Data
Apr. 28, 2020 (IN) .............................. 202041018140

(51) Int. Cl.
*G06F 16/00* (2019.01)
*G06F 7/00* (2006.01)
(Continued)

(52) U.S. Cl.
CPC ...... *G06F 16/24542* (2019.01); *G06F 16/217* (2019.01)

(58) Field of Classification Search
CPC .................. G06F 16/24542; G06F 16/217
(Continued)

(56) References Cited

U.S. PATENT DOCUMENTS 9,454,321 B1 9/2016 Smaldone et al.
9,852,160 B1 * 12/2017 Ramalingam ........... G06F 16/27
2020/0236085 A1 * 7/2020 Spurlock ............. G06F 11/3006

FOREIGN PATENT DOCUMENTS

EP 3495952 A1 6/2019
EP 3553658 A1 10/2019

OTHER PUBLICATIONS

Extended European Search Report in Europe Application No. 21161819.4, dated Sep. 9, 2021, 10 pages.

* cited by examiner

Primary Examiner — Raquel Perez-Arroyo
(74) Attorney, Agent, or Firm — Crowell & Moring LLP

(57) ABSTRACT

A system includes a multi-layer throughput optimization (TPO) stack to generate a token containing prescriptions for rightsizing database service throughput. A prescriptive engine layer of the TPO stack may obtain consumed throughputs from the utilization tracking data; predict, based on the consumed throughputs, a prediction-based throughput for the target NoSQL database service; select target consumed throughputs from the consumed throughputs based on a time granularity; determine a statistical throughput consumption value from the target consumed throughputs; calculate a statistics-based throughput over a TPO interval based on the statistical throughput consumption value; extract database service performance metric data from the utilization tracking data; select target performance metric data from the database service performance metric data based on the time granularity; determine a statistical performance metric value from the target performance metric data; select one of the prediction-based throughput and the statistics-based throughput as based on the statistical performance metric value.

20 Claims, 12 Drawing Sheets

(51) Int. Cl.
*G06F 16/2453* (2019.01)
*G06F 16/21* (2019.01)

(58) Field of Classification Search
USPC .......................................................... 707/718
See application file for complete search history.

| Casmas Resource ID | DB RU Recommendation | Storage Sizing |
|---|---|---|
| Micorsaft.Amure/CasmasDB/DB/DB1 | Yes | No |
| Micorsaft.Amure/CasmasDB/DB/DB2 | Yes | No |
| Micorsaft.Amure/CasmasDB/DB/DB3 | Casmas Resource ID | |
| Micorsaft.Amure/CasmasDB/DB/DB4 | Microsaft.Amure/CasmasDB/DB/DB3/CT1 | |
| Micorsaft.Amure/CasmasDB/DB/DB5 | Microsaft.Amure/CasmasDB/DB/DB3/CT2 | |
| Micorsaft.Amure/CasmasDB/DB/DB6 | Microsaft.Amure/CasmasDB/DB/DB3/CT3 | |
| Micorsaft.Amure/CasmasDB/DB/DB7 | Microsaft.Amure/CasmasDB/DB/DB3/CT4 | |
| Micorsaft.Amure/CasmasDB/DB/DB8 | Microsaft.Amure/CasmasDB/DB/DB3/CT5 | |
| Micorsaft.Amure/CasmasDB/DB/DB9 | Microsaft.Amure/CasmasDB/DB/DB3/CT6 | |
| Micorsaft.Amure/CasmasDB/DB/DB9 | Yes | No |
| Micorsaft.Amure/CasmasDB/DB/DB10 | Yes | No |
| Micorsaft.Amure/CasmasDB/DB/DB11 | Yes | Yes |
| Micorsaft.Amure/CasmasDB/DB/DB12 | Yes | No |
| Micorsaft.Amure/CasmasDB/DB/DB13 | Yes | No |
| Micorsaft.Amure/CasmasDB/DB/DB14 | Yes | Yes |
| Micorsaft.Amure/CasmasDB/DB/DB15 | Yes | Yes |
| Micorsaft.Amure/CasmasDB/DB/DB16 | Yes | Yes |
| Micorsaft.Amure/CasmasDB/DB/DB17 | Yes | Yes |
| Micorsaft.Amure/CasmasDB/DB/DB18 | Yes | Yes |
| Micorsaft.Amure/CasmasDB/DB/DB19 | Yes | Yes |
| Micorsaft.Amure/CasmasDB/DB/DB20 | Yes | No |
| Micorsaft.Amure/CasmasDB/DB/DB21 | Yes | Yes |
| Micorsaft.Amure/CasmasDB/DB/DB22 | Yes | No |
| Micorsaft.Amure/CasmasDB/DB/DB23 | Yes | Yes |
| Micorsaft.Amure/CasmasDB/DB/DB24 | No | Yes |
| Micorsaft.Amure/CasmasDB/DB/DB25 | Yes | No |
| Micorsaft.Amure/CasmasDB/DB/DB26 | Yes | No |
| Micorsaft.Amure/CasmasDB/DB/DB27 | Yes | No |
| Micorsaft.Amure/CasmasDB/DB/DB28 | No | Yes |
| Micorsaft.Amure/CasmasDB/DB/DB29 | Yes | No |
| Micorsaft.Amure/CasmasDB/DB/DB30 | Yes | No |

FROM Figure 5A

Casmas DB Summary

| Container RU Recommendation | Current Monthly Price ($) | Price Post Implementation ($) |
|---|---|---|
| Yes | $7,320 | $6,220 |
| No | $4,220 | $3,370 |
| | $3,060 | $2,410 |
| | $890 | $660 |
| | $870 | $670 |
| | $810 | $650 |
| | $560 | $450 |
| | $381 | $301 |
| No | $500 | $425 |
| Yes | $362 | $292 |
| No | $352 | $287 |
| Yes | $300 | $240 |
| No | $271 | $216 |
| Yes | $300 | $248 |
| Yes | $249 | $199 |
| No | $236 | $188 |
| No | $218 | $173 |
| Yes | $213 | $173 |
| No | $200 | $165 |
| Yes | $184 | $152 |
| Yes | $139 | $109 |
| Yes | $136 | $111 |
| Yes | $133 | $109 |
| Yes | $117 | $95 |
| Yes | $113 | $93 |
| No | $105 | $87 |
| Yes | $106 | $89 |
| Yes | $94 | $79 |
| Yes | $75 | $63 |
| Yes | $45 | $35 |

FROM Figure 5B

PRESCRIPTIVE ANALYTICS BASED NOSQL DATABASE SERVICE OPTIMIZATION SYSTEM FOR CLOUD COMPUTING

RELATED APPLICATION

The present application claims priority to Indian Provisional Patent Application No. 202041018140, entitled "PRESCRIPTIVE ANALYTICS BASED NOSQL DATABASE SERVICE OPTIMIZATION SYSTEM FOR CLOUD COMPUTING" filed on Apr. 28, 2020, wherein the entirety of the above-referenced application is incorporated herein by reference.

TECHNICAL FIELD

This disclosure relates to database service optimization via a prescriptive analytics based NoSQL database service optimization system.

BACKGROUND

Rapid advances in communications and storage technologies, driven by immense customer demand, have resulted in widespread adoption of cloud systems for managing large data payloads, distributed computing, and record systems. As one example, modern enterprise systems, for example those relying on object storage architectures, presently maintain data records many petabytes in size in the cloud. Improvements in tools for cloud resource allocation, utilization, and consumption prediction will further enhance the capabilities of cloud computing systems.

SUMMARY

This disclosure relates to systems and methods for optimizing throughput of a NoSQL database service commissioned by users, such as business organizations, of cloud based computing architectures to process their data.

In one embodiment, a system for optimizing NoSQL database service throughput for users of these cloud based services is disclosed. The system may include a network interface circuitry and an optimization circuitry in data communication with the network interface circuitry. The network interface circuitry may be configured to receive utilization tracking data for a target NoSQL database service provisioned with provisioned throughputs for processing a user's cloud based services data. The provisioned throughputs may represent a contracted capacity of the target NoSQL database service to process a user's data per unit time. The network interface circuitry may send a throughput optimization (TPO) token to a host interface. The host interface may be configured to execute the TPO token to provision the target NoSQL database service with a recommended throughput. The optimization circuitry may be configured to execute a TPO stack. At a prescriptive engine layer of the TPO stack, the TPO stack may be executable to obtain consumed throughputs for each unit time from the utilization tracking data; predict, based on the consumed throughputs, a prediction-based throughput over a TPO interval for the target NoSQL database service with a prediction engine; select target consumed throughputs from the consumed throughputs based on a predetermined time granularity; determine a statistical throughput consumption value from the target consumed throughputs, the statistical throughput consumption value is greater than consumed throughput values of a predetermined portion of the target consumed throughputs; calculate a statistics-based throughput over the TPO interval for the target NoSQL database service based on the statistical throughput consumption value; extract database service performance metric data for each unit time from the utilization tracking data; select target performance metric data from the database service performance metric data based on the predetermined time granularity; determine a statistical performance metric value from the target performance metric data, the statistical performance metric value is greater than performance metric values of a predetermined portion of the target performance metric data; select one of the prediction-based throughput and the statistics-based throughput as the recommended throughput based on the statistical performance metric value, a performance metric threshold, and a prediction accuracy of the prediction engine; perform a throughput determination to execute a throughput optimization for the target NoSQL database service based on the recommended throughput; and generate the TPO token based on the throughput determination.

In another embodiment, a method for optimizing database service throughput is disclosed. The method may include, at network interface circuitry, receiving utilization tracking data for a target NoSQL database service provisioned with provisioned throughputs. The provisioned throughput may represent a capacity of the target NoSQL database service to process data per unit time. An optimization circuitry may be in data communication with the network interface circuitry, the method may execute a throughput optimization (TPO) stack, including, at a prescriptive engine layer of the TPO stack, obtaining consumed throughputs for each unit time from the utilization tracking data; predicting based on the consumed throughputs, a prediction-based throughput over a TPO interval for the target NoSQL database service with a prediction engine; selecting target consumed throughputs from the consumed throughputs based on a predetermined time granularity; determining a statistical throughput consumption value from the target consumed throughputs, the statistical throughput consumption value is greater than consumed throughput values of a predetermined portion of the target consumed throughputs; calculating a statistics-based throughput over the TPO interval for the target NoSQL database service based on the statistical throughput consumption value; extracting database service performance metric data for each unit time from the utilization tracking data; selecting target performance metric data from the database service performance metric data based on the predetermined time granularity; determining a statistical performance metric value from the target performance metric data, the statistical performance metric value is greater than performance metric values of a predetermined portion of the target performance metric data; selecting one of the prediction-based throughput and the statistics-based throughput as a recommended throughput based on the statistical performance metric value, a performance metric threshold, and a prediction accuracy of the prediction engine; performing a throughput determination to execute a throughput optimization for the target NoSQL database service based on the recommended throughput; and generating a TPO token based on the throughput determination. The method may include sending, via the network interface circuitry, the TPO token to a host interface configured to execute the TPO token to provision the target NoSQL database service with the recommended throughput.

In another embodiment, a product for optimizing database service throughput is disclosed. The product may include machine-readable media other than a transitory signal and instructions stored on the machine-readable media. The instructions may be configured to, when executed, cause a machine to, at network interface circuitry, receive utilization tracking data for a target NoSQL database service provisioned with provisioned throughputs. The provisioned throughput may represent a capacity of the target NoSQL database service to process data per unit time. An optimization circuitry may be in data communication with the network interface circuitry. At the optimization circuitry executing a throughput optimization (TPO) stack, the instructions may be configured to, when executed, cause a machine to, at a prescriptive engine layer of the TPO stack, obtain consumed throughputs for each unit time from the utilization tracking data; predict, at the prescriptive engine layer, based on the consumed throughputs, a prediction-based throughput over a TPO interval for the target NoSQL database service with a prediction engine; select target consumed throughputs from the consumed throughputs based on a predetermined time granularity; determine a statistical throughput consumption value from the target consumed throughputs, the statistical throughput consumption value is greater than consumed throughput values of a predetermined portion of the target consumed throughputs; calculate a statistics-based throughput over the TPO interval for the target NoSQL database service based on the statistical throughput consumption value; extract database service performance metric data for each unit time from the utilization tracking data; select target performance metric data from the database service performance metric data based on the predetermined time granularity; determine a statistical performance metric value from the target performance metric data, the statistical performance metric value is greater than performance metric values of a predetermined portion of the target performance metric data; select one of the prediction-based throughput and the statistics-based throughput as a recommended throughput based on the statistical performance metric value and an performance metric threshold; perform a throughput determination to execute a throughput optimization for the target NoSQL database service based on the recommended throughput; and generate a TPO token based on the throughput determination. The instructions may be configured to, when executed, cause a machine to send, via the network interface circuitry, the TPO token to a host interface configured to execute the TPO token to provision the target NoSQL database service with the recommended throughput.

One interesting feature of the system and method described below may be that it may accurately analyze the throughput of a cloud NoSQL database service such as a NoSQL database or a NoSQL container to be consumed in a next time interval. For example, the system may predict a prediction-based throughput over the next time interval based on historically consumed throughputs with a deep-learning prediction engine. Also, the system may calculate a statistics-based throughput that exceeds a predetermined portion of historically consumed throughputs. Then, the system may select one of the prediction-based throughput and the statistics-based throughput as a recommended throughput based on a historical database service performance metric and the accuracy of the prediction engine. In an example, where the database service performance metric is within a predetermined performance metric threshold and the accuracy of the prediction engine is greater than a predetermined accuracy threshold, the system may select the prediction-based throughput as the recommended throughput. Where the accuracy of the prediction engine is below a predetermined accuracy threshold, the system may select the statistics-based throughput as the recommended throughput.

Alternatively or additionally, another interesting feature of the system and method described below may be that it may present deeper insights into the distribution of the utilization curve of the NoSQL database service in the prescriptive analysis. For example, in calculating the statistics-based throughput, the system may make use of percentile calculation instead of average calculation. In this way, the outlier data such as unacceptably high consumed throughput may be taken into account in the throughput optimization analysis.

Alternatively or additionally, another interesting feature of the system and method described below may be that it may optimize the throughput of the NoSQL database service without sacrificing the computing performance of the NoSQL database service. For example, the system may selectively add throughput buffer for the recommended throughput. Where the ratio of the throughput provisioned on the NoSQL database service to the throughput consumed by the NoSQL database service is less than a consumption ratio threshold, the system may add higher throughput buffer for the recommended throughput. Otherwise, the system may add lower throughput buffer to the recommended throughput.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIGS. 5A-5D show an example throughput optimization control interface.

DETAILED DESCRIPTION

NoSQL database services may provide cloud computing services to a user such as a business organization, including data storage service and data processing service. NoSQL database services may handle larger volumes of rapidly changing unstructured data, for example, data generated from the cloud, mobile, social media and big data, than a relational (SQL) database with rows and tables.

Figure 1A:
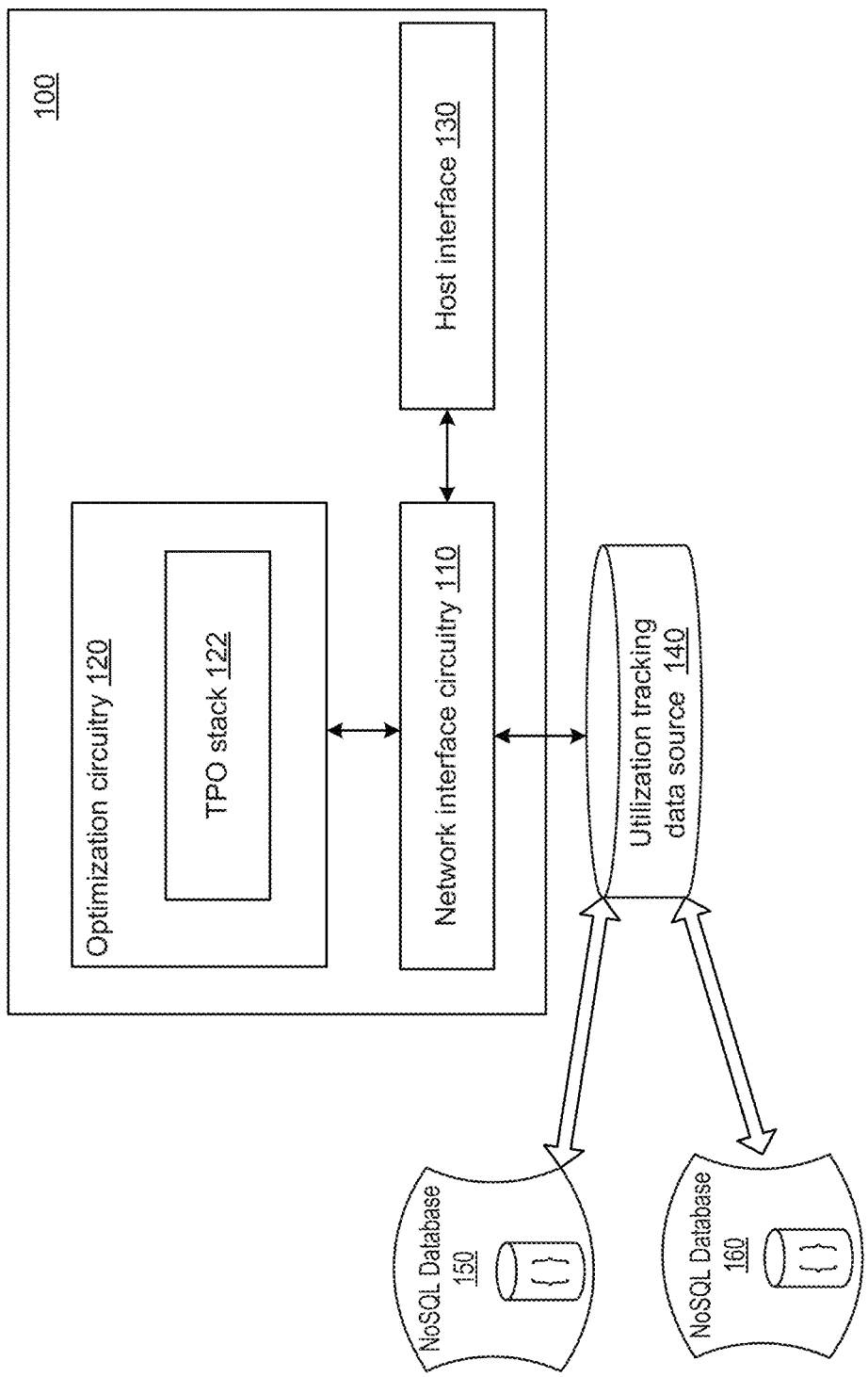
FIG. 1A shows an example system for NoSQL database service throughput optimization in accordance with an embodiment.

FIG. 1A illustrates an example system 100 for NoSQL database service throughput optimization. The system 100 may include a network interface circuitry 110, an optimization circuitry 120, and a host interface 130. The network interface circuitry 110 may communicate with the optimization circuitry 120 and the host interface 130. The utilization tracking data source 140 may store the utilization track data of the cloud databases 150/160. The network interface circuitry 110 may communicate with the utilization tracking data source 140 to receive utilization tracking data for a target NoSQL database service such as the NoSQL Database 150 or 160. The optimization circuitry 120 may execute the throughput optimization (TPO) stack 122 to perform prescriptive analysis on the throughputs of the target NoSQL database service. The functions of the TPO stack 122 will be described in detail later with reference to FIG. 2. During execution of the TPO stack 122, the optimization circuitry 120 may generate a TPO token which may, for example, include a logic rightsizing the throughput provisioned for the target NoSQL database service. The network interface circuitry 110 may send the TPO token to the host interface 130. The host interface 130 may, for example, include an Application Programming Interface (API) for rightsizing the provisioned throughput for a target NoSQL database service and execute the TPO token with the API to right size the throughput provisioned for the target NoSQL database service.

A NoSQL database service such as the NoSQL database 150 or 160 may be provisioned with provisioned throughputs. A provisioned throughput may represent a contracted capacity of the database service to process a contracting user's data per unit time. Data processing operations by the database service that are contracted by a user may include, for example, create operations, read operations, update operations, and delete operations. A throughput may be represented by, for example, a request unit rate, for example, request units per second (RU/s) being consumed by a user under their respective contract for data services.

Taking Azure Cosmos database as an example, the Cosmos database supports many APIs, such as SQL, MongoDB, Cassandra, Gremlin, and Table. Each API has its own set of database operations. These operations range from simple point reads and writes to complex queries. Each database operation consumes system resources based on the complexity of the operation. The Cosmos database may normalize the cost of all database operations as request units. In other words, the Cosmos database abstracts system resources, such as central processing unit (CPU), input/output operations per second (IOPS), and random access memory (RAM) that are required to perform the data processing operations requested by a user of Cosmos database to the request units. For example, the cost to read a 1 KB item is 1 RU. A minimum of 10 RU/s is required to store each 1 GB of data. All other database operations may be similarly assigned a cost using RUs. No matter which API the user uses to interact with the Cosmos database, costs may be measured by RUs. Whether the database operation is a write, read, or query, costs may be measured in RUs.

When a user contracts to use data storage and processing services provided by the Cosmos database, the Cosmos database may provision the user with RUs for the data services. However, the workloads of the data services may change over time. As a result, provisioned RUs may not reflect actual RU demands. For example, provisioned RUs may be much more than the RUs actually consumed by the user. In this example, the system 100 may enable the user to optimize the provisioned RUs, for example, by downsizing the provisioned RUs based on the historical RU utilization track data of the user. In this way, the system 100 may improve the utilization efficiency of the Cosmos database and the user's maintenance efficiency of the data services provided by the Cosmos database.

In the Cosmos database, the throughput, i.e., RUs, may be provisioned at two NoSQL database service levels, NoSQL database and NoSQL container. The NoSQL database may include, for example, a keyspace, a database, and a database account. The NoSQL container may include, for example, a collection, a graph, and a table. Thus, a NoSQL database service (Hereinafter database service) may represent a NoSQL database (Hereinafter database) or a NoSQL container (Hereinafter container).

In examples, a database may include a plurality of containers. When a throughput is provisioned on a database, the throughput may be shared across all the containers (which may be referred to as shared database containers) in the database. The portion of the throughput that a shared database container can receive may be based on the number of containers in the database, the choice of partition keys for the containers, and the distribution of the workload across various logical partitions of the containers.

Figure 1B:
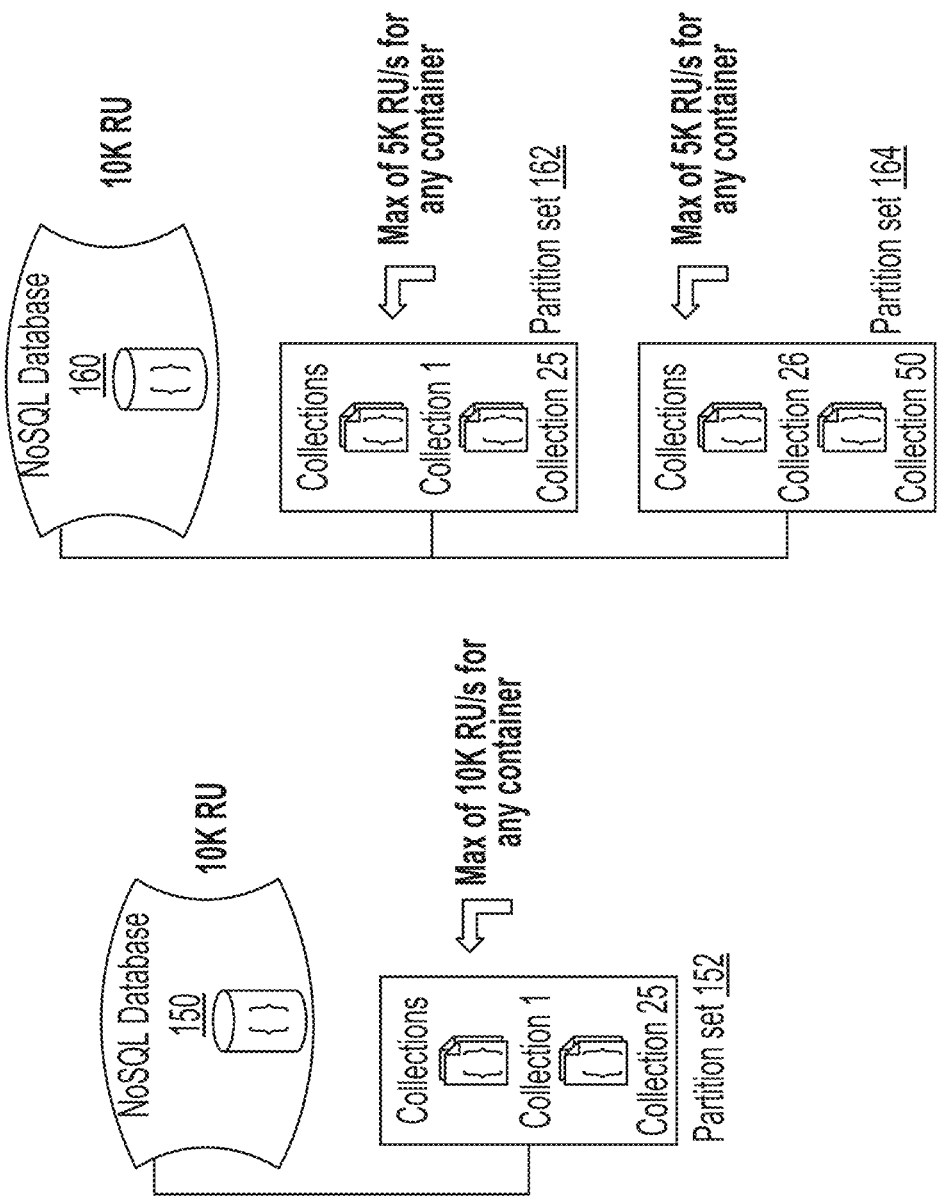
FIG. 1B shows an example throughput provisions on NoSQL database services.

FIG. 1B shows an example throughput provisions on the databases 150/160. In an example, the database 150 may include one partition set 152 which includes 25 containers. The database 150 of this example is provisioned with 10K (10,000) RUs, and the 25 containers may share this throughput. Any container may have a maximum throughput, such as, for example, 10K RU/s. In another example, the database 160 may include two partition sets 162/164. The partition set 162 of this example includes 25 containers 1 through 25, and the partition set 164 of this example includes 25 containers 26 through 50. The database 160 of this example is provisioned with 10K RUs. As such, the two partition sets 162/164 may split the throughput provisioned on the database 160, each of which is provisioned with, for example, 5K (5,000) RUs throughput. The containers within each of the two partition sets of the example may share the 5K RUs throughput. Additionally, a container may be provisioned with a dedicated throughput. Such dedicated throughput is exclusively reserved for the container.

In the embodiment, with reference to FIG. 1A, the system 100 may perform prescriptive analysis on two database services, i.e., the databases 150/160, to optimize the throughput of the databases. However, it should be appreciated that the system 100 may perform the prescriptive analysis on one or more database services, including databases and containers within the databases. The database services may be located in the same or different geographical regions.

Figure 2:
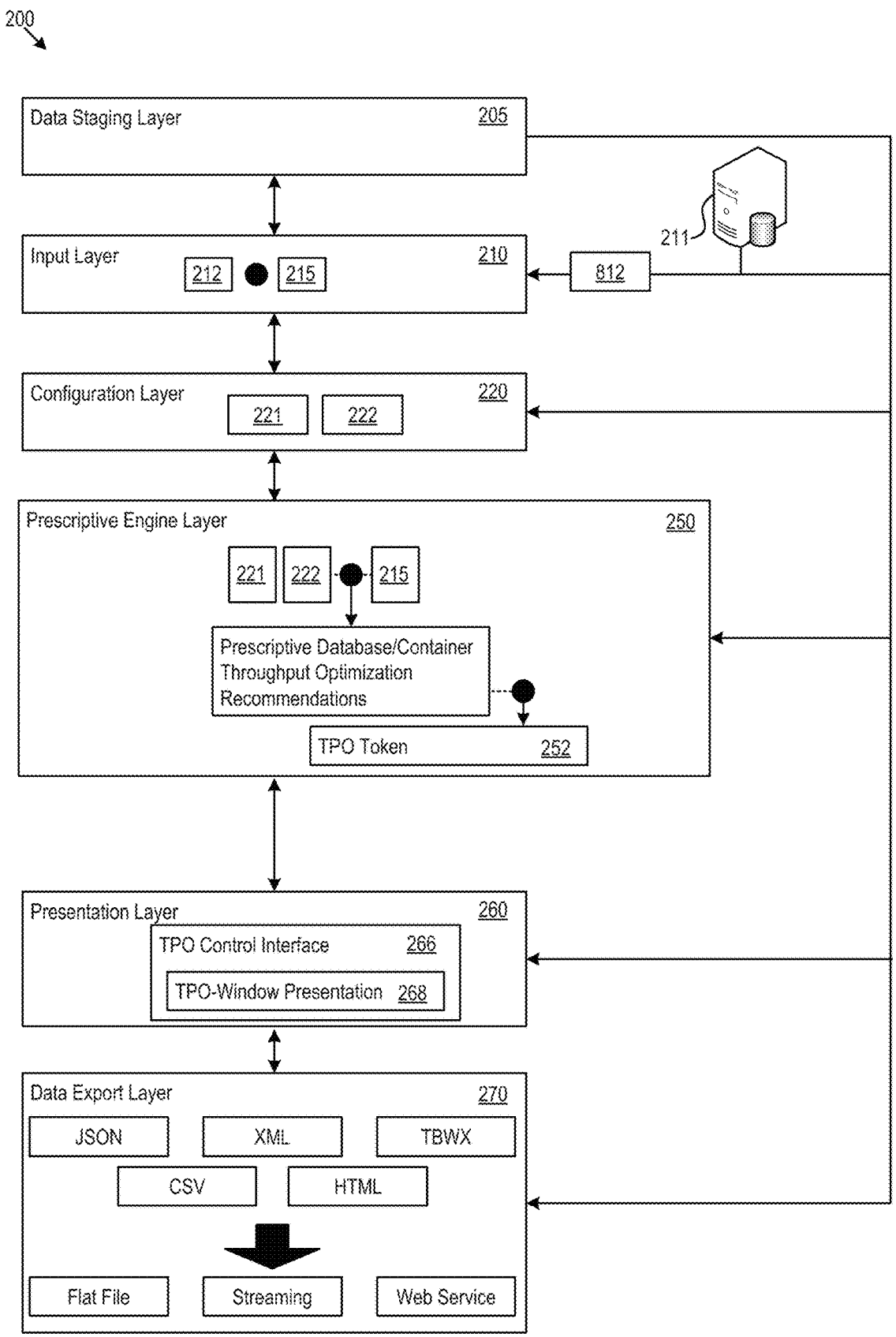
FIG. 2 shows an example multiple-layer throughput optimization stack included in a system.

FIG. 2 shows an example multiple layer TPO stack 200. The system described herein uses the TPO stack 200 to prescribe recommendations for database service throughput optimization based on analysis of data associated with the database service. The throughput optimization analysis performed by the system may include, for example, rightsizing/downsizing the provisioned throughputs on a database service such as a database and container. Further, the system may include in the analysis utilization tracking data and consumption metrics data of the database service. The consumption metrics data may, for example, include data of cost metrics of the database service. The utilization tracking data may include, for example, the tracking data of consumed throughputs as well as database service performance metric data. The consumed throughput may represent a historical database service throughput that was actually used per unit time.

The database service performance metric data may include, for example, rate limited request records, error rate records, and throughput failed request records. The rate limited request may represent an operation request(s) that is rejected when the consumed RU rate exceeds the provisioned RU rate. The throughput failed request may represent an operation request(s) that is throttled by the database service before the consumed RU rate exceeds the provisioned RU rate. In addition, request errors may occur in the course of processing operation requests by the database service, for example, due to database service unavailability or downtime, poor network performance, packet error, and bit error. These errors may be represented as error rates.

Thus, the TPO stack 200 may provide prescriptive recommendations for throughput optimization taking into account provisioned throughputs, consumed throughputs, database service performance metrics such as rate limited requests, throughput failed request, and error rates, consumption metrics data, and/or other data. As a result, the disclosed TPO stack techniques and architectures improve the operation efficiency of the underlying hardware by optimizing throughput of one or more database service.

In this example, the TPO stack 200 may include a data staging layer 205, an input layer 210, a configuration layer 220, a prescriptive engine layer 250, a presentation layer 260, and a data export layer 270. The TPO stack 200 may include a multiple-layer computing structure of hardware and software that may provide prescriptive analytical recommendations (e.g., throughput optimization prescriptions) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the TPO stack 200, the data staging layer 205 may provide the input layer 210 with storage resources to store ingested data within a database or other data structure. In some implementations, the data staging layer 205 may be deployed as a cloud-based database platform with the capability to process mass data. In an example, an underlying Big Data Lake of the database platform is capable of ingesting data from heterogeneous data sources such as Secured Storage, Hadoop file systems (HDFS) connections, relational databases, flat files, and other data operations. Hence, the data staging layer 205 may provide a hardware resource, e.g., memory resources, to the input layer 210. Accordingly, the multiple-layer stack architecture of the TPO stack 200 may improve the functioning of the underlying hardware.

Figure 3:
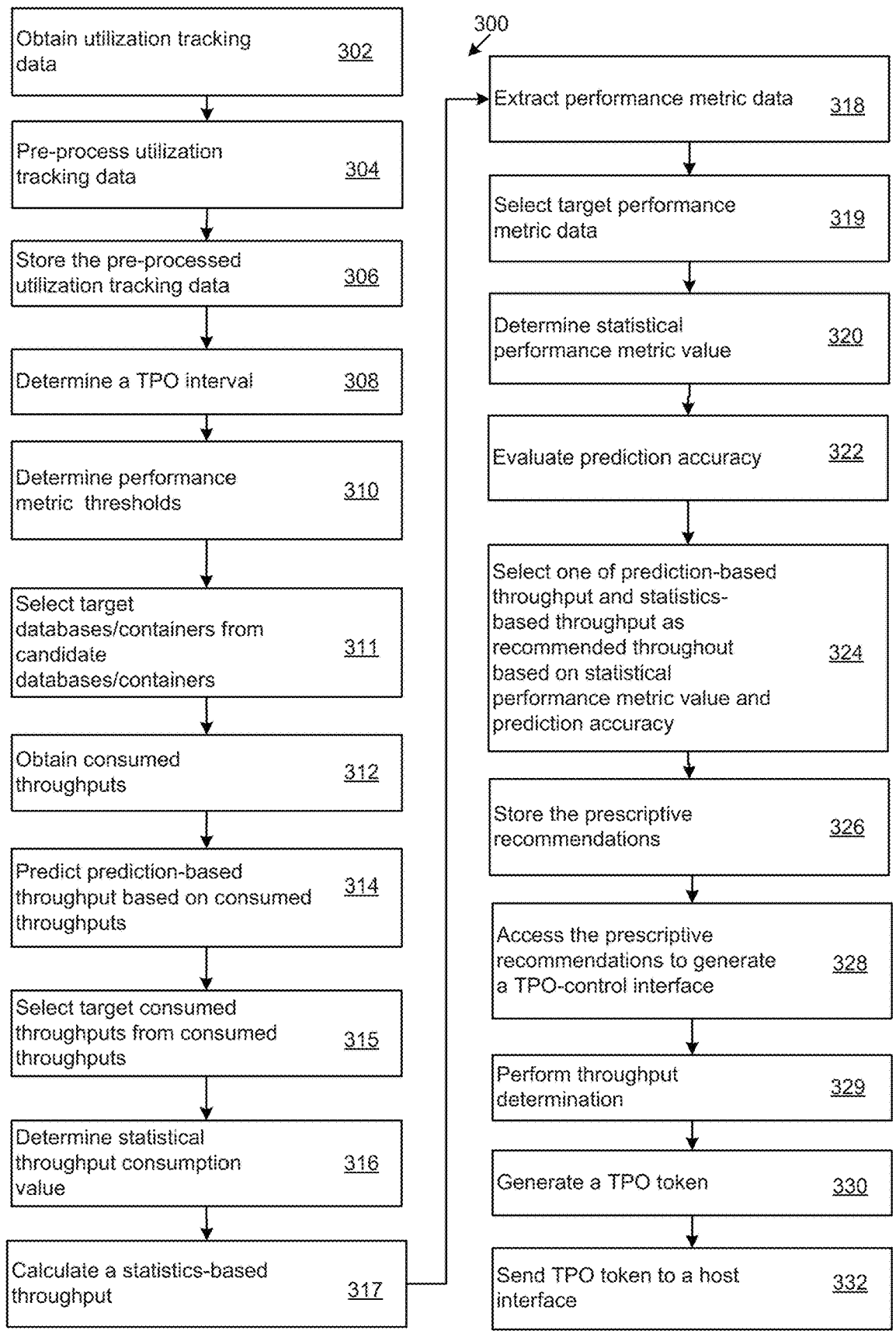
FIG. 3 shows example throughput optimization logic.

In the following, reference is made to FIG. 2 and the corresponding example TPO logic (TOL) 300 in FIG. 3. The logical features of TOL 300 may be implemented in various orders and combinations. For example, in a first implementation, one or more features may be omitted or reordered with respect to a second implementation. At the input layer 210 of the TPO stack 200, the TOL 300 may obtain utilization tracking data 212 of the database service as the input data (302). In some cases, the utilization tracking data 212 may be received via the network interface circuitry (e.g., communication interfaces 812, discussed below). The utilization tracking data 212 may be accessed at least in part, e.g., via the communication interfaces 812, from data sources 211, which may include, database service utilization files, database service performance metric files, database service expenditure files, or other data sources.

Optionally, at the input layer 210, the TOL 300 may pre-process the utilization tracking data 212 (304). In some implementations, the pre-processing may include data transformations on the utilization tracking data 212 such as z transformation, log transformation and data minimization. Alternatively or additionally, the pre-processing may treat/manage missing value data in the utilization tracking data 212. For example, the utilization tracking data may be used for further analysis only when utilization records in the utilization tracking data has corresponding expenditure records. Alternatively or additionally, the pre-processing may include data aggregation on the utilization tracking data 212. For example, the utilization data may be aggregated from minute-level granularity to hour-level granularity. Alternatively or additionally, the pre-processing may supplement exogenous utilization data to the utilization tracking data. The exogenous utilization data may include any seasonal-based utilization patterns. Additionally, outlier data such as extraordinarily high consumed throughput at a specific time unit may not be processed in the pre-processing for at least two reasons: the outlier data may accurately reflect the utilization of the database service and the outlier data may be useful in the subsequent optimization analysis to determine a recommended throughput.

The TOL 300 then may, at the input layer 210, store the pre-processed utilization tracking data 215 via a memory operation at the data staging layer 205 (306). In some implementations, the pre-processed utilization tracking data 215 may be indexed to speed up query processing.

At the configuration layer 220, the TOL 300 may determine a TPO interval 221 to optimize throughputs of the database service (308). For example, the TPO interval 221 may be predetermined to be periodical or non-periodical (e.g., hourly, six hours, daily, weekly, month-date). Alternatively or in addition, in another example, the TPO interval 221 may be selected by the system operator.

In addition, to optimize the throughputs of the database service, the TOL 300 may, at the configuration layer 220, further determine various performance metric thresholds 222 for the database services (310). The performance metric thresholds may include, for example, a rate limited request threshold, an error rate threshold, and a throughput failed request threshold. For example, the TOL 300 may determine the performance metric thresholds 222 for the database service through selections received from the system operator.

Figure 4:
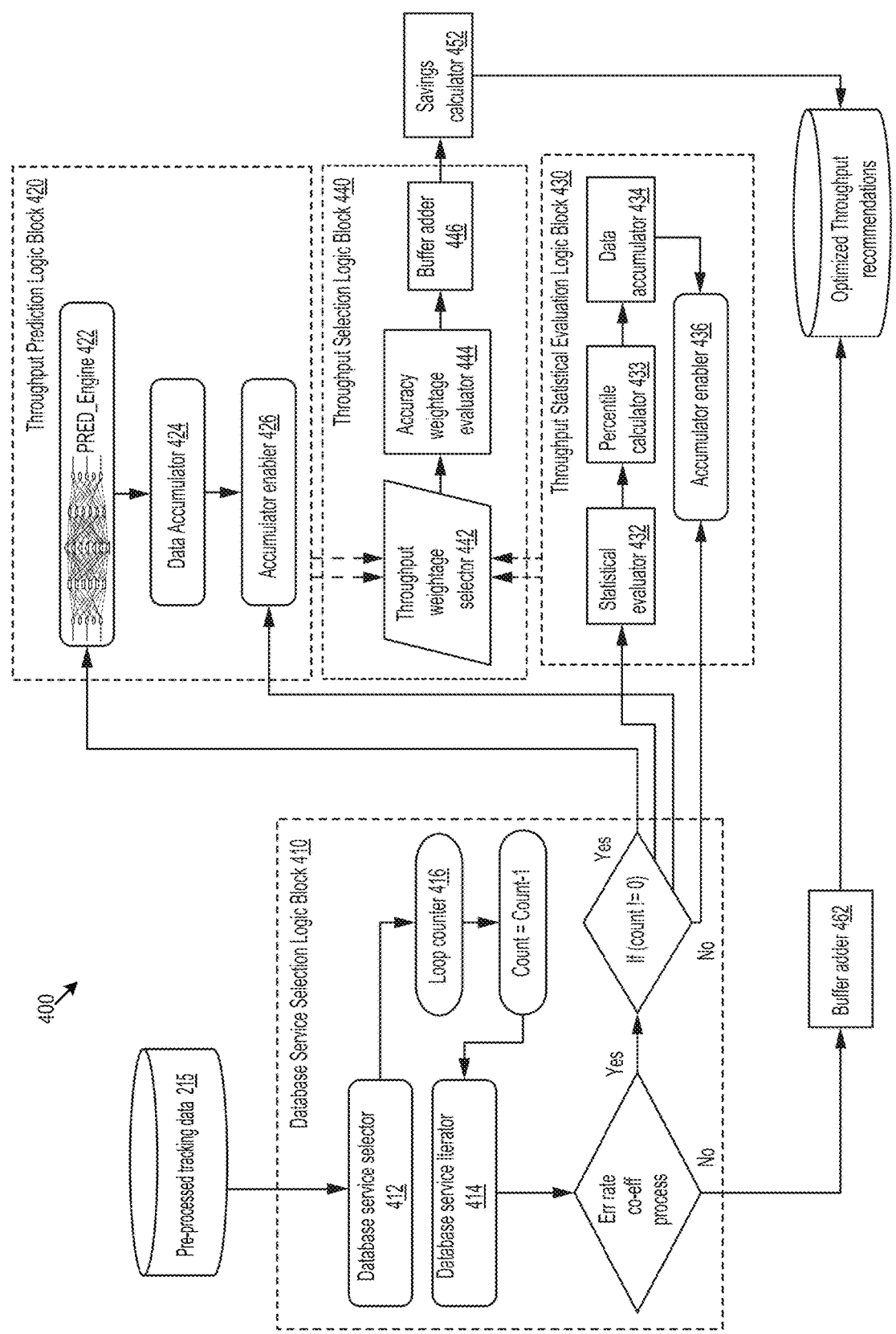
FIG. 4 shows an example system execution implementation for a prescriptive engine layer of the throughput optimization stack in accordance with an embodiment.
Figure 5A:
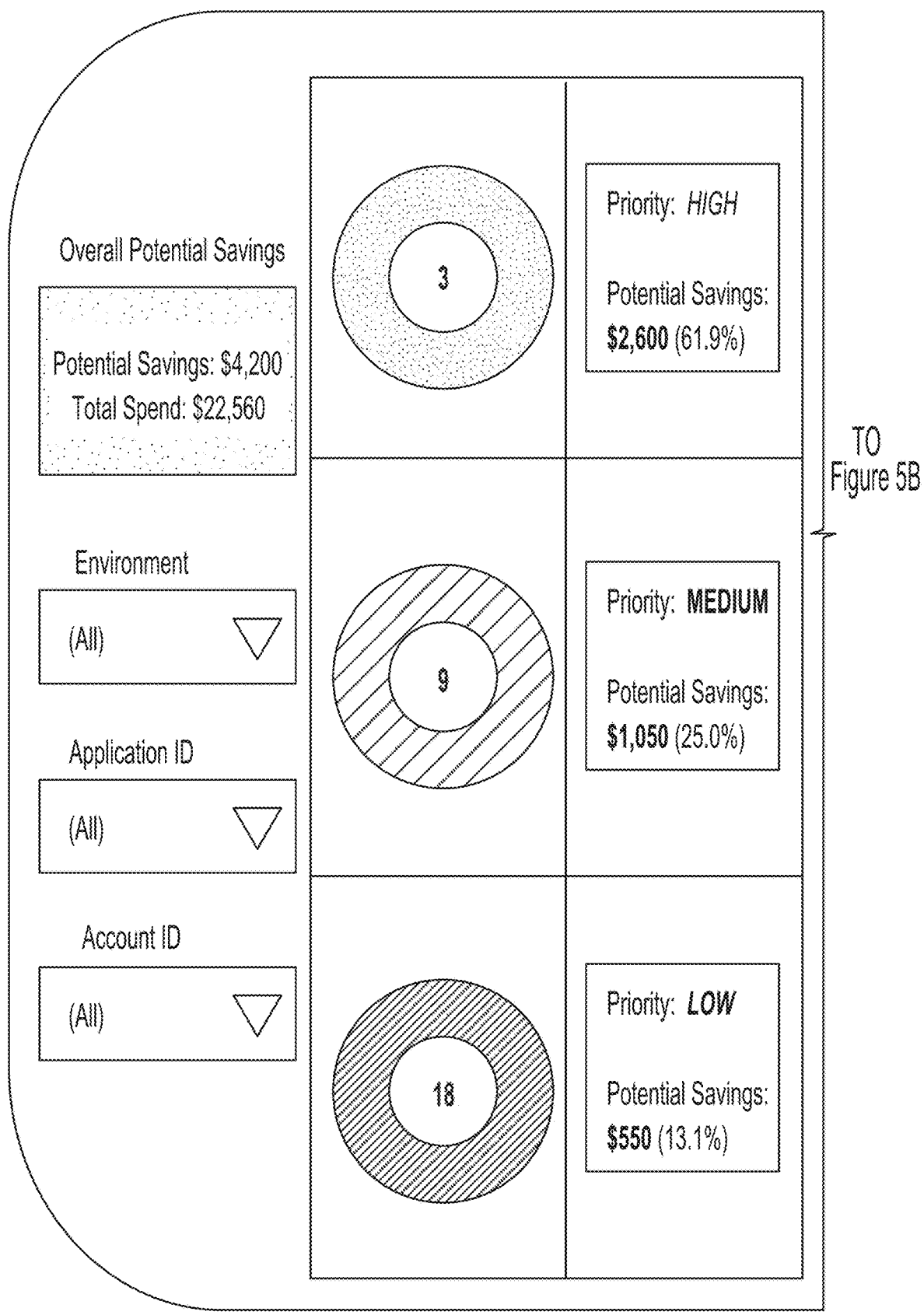
Figure 5D:
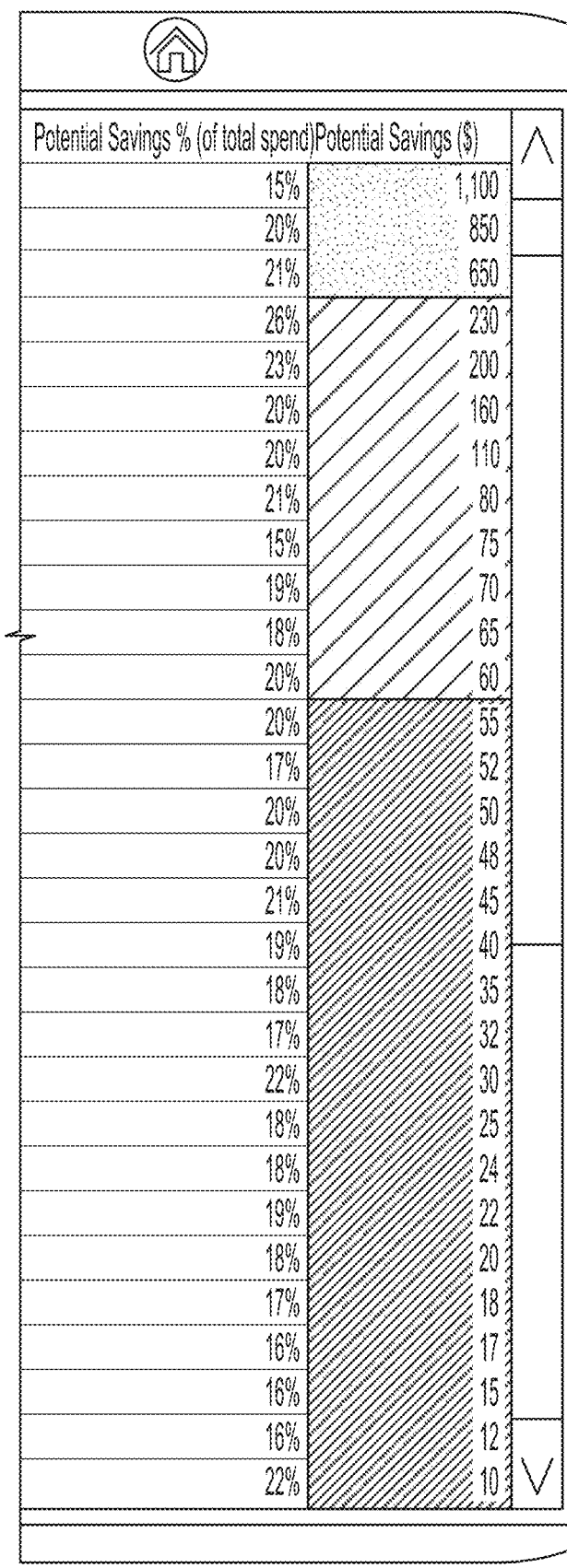

At the prescriptive engine layer 250, the TOL 300 may analyze the database service to generate throughput optimization recommendations. FIG. 4 is a block diagram example of a system 400 illustrating execution implementation for the prescriptive engine layer 250 of the TPO stack 200. Example operation of the TOL 300 at the prescriptive engine layer 250 will be described with reference to the system 400 of FIG. 4.

The execution of the system 400 may include a database service selection logic block 410, a throughput prediction logic block 420, a throughput statistical evaluation logic block 430, and a throughput selection logic block 440. The database service selection logic block 410 may include a database service selector 412, a database service iterator 414, and a loop counter 416. The throughput prediction logic block 420 may include a prediction engine 422, a data accumulator 424, and an accumulator enabler 426. The throughput statistical evaluation logic block 430 may include a statistical evaluator 432, a percentile calculator 433, a data accumulator 434, and an accumulator enabler 436. The throughput selection logic block 440 may include a throughput weightage selector 442, an accuracy weightage evaluator 444, and a buffer adder 446.

At the database service selection logic block 410, the TOL 300 may select target database services from candidate database services based on the pre-processed utilization tracking data 215 of the candidate database services (311).

In an implementation, at the database service selector 412, the TOL 300 may obtain a utilization time length for a candidate database service and a utilization data missing coefficient for the candidate database service via the data-staging layer 205. The utilization time length may be represented by days and the utilization data missing coefficient may represent the percentage of days for which the utilization data is missing over the utilization time length. Then, the TOL 300 may select the candidate database service as a target database service for throughput optimization if the utilization time length is greater than or equal to a utilization time length threshold and the utilization data missing coefficient is less than a data missing tolerance threshold. The utilization time length threshold may range, for example, from 30 days to 90 days.

For example, the utilization time length threshold is 90 days and the data missing tolerance threshold is 10%. If a database service has 90 days of utilization but only has 83 days of utilization tracking data, i.e., 7 days of utilization tracking data is missing, the utilization tracking data missing coefficient of the database service is 7.8% (i.e., 7/90). Because the utilization time length of the database service (90 days) is equal to the utilization time length threshold (90 days) and the utilization data missing coefficient of the database service (7.8%) is less than the data missing tolerance threshold (10%), the TOL 300 may select the database service as a target database service for subsequent throughput optimization analysis.

After processing the candidate database service at the database service selector 312, the TOL 300 may, at the loop counter 416, count the remained candidate database services that have yet to be processed. If the count value is greater than zero, the TOL 300 may iterate the database service selection operation at the database service iterator 414 to select target database services until all the candidate database services have been processed. Optionally, if a candidate database service is not selected as one of the target database services, the TOL 300 may add a predetermined buffer to the provisioned throughput of the candidate database service at the buffer adder 462 and take the buffered provisioned throughput as a recommended throughput of the candidate database service.

At the throughput prediction logic block 420, the TOL 300 may obtain consumed throughputs of the target database service for each unit time from the pre-processed utilization tracking data 215 via the data-staging layer 205 (312). The unit time may be, for example, second, minute, and hour. The TOL 300 then may predict prediction-based throughput over a next TPO interval for the target database service selected at the database service selection logic block 410 based on the consumed throughputs (314). The prediction engine 422 may include a deep machine learning model trained to predict the database service throughputs for individual target database services. The deep machine learning model may be recurrent neural network (RNN) such as a long short-term memory (LSTM) network.

A LSTM network may include multiple LSTM units. In contrast to an ordinary RNN unit only including an input gate and an output gate, the LSTM unit may include more elements, such as a cell, an input gate, an output gate and a forget gate. The cell may maintain information in memory for long period of time. The three gates regulate the flow of information into and out of the cell. Such deep learning architecture may help learn longer-term dependencies among input data.

The throughputs may be predicted on the basis of a predetermined time granularity. For example, if the predetermined time granularity is hourly, the TOL 300 may predict throughputs for each hour in the next TPO interval. If the predetermined time granularity is six-hour, the TOL 300 may predict the throughputs for each six-hour in the next TPO interval. In some implementations, the throughput with the maximum throughput value among all the predicted throughputs of each hour/six-hour in the next TPO interval may be taken as the prediction-based throughput for the database service over the next TPO interval.

The TOL 300 may output prediction-based throughput results for the individual target database services to the data accumulator 424. At the accumulator enabler 426, the TOL 300 may monitor if all of the target database services have been predicted at the throughput prediction logic block 420.

Referring to the throughput statistical evaluation logic block 430, the TOL 300 may obtain consumed throughputs for each unit time from the pre-processed utilization tracking data 215 via the data-staging layer 205. The unit time may be, for example, second, minute, and hour. Then, the TOL 300 may select target consumed throughputs from the consumed throughputs on the basis of the predetermined time granularity at the statistical evaluator 432 (315). Each of the target consumed throughputs may have a maximum consumed throughput value among consumed throughputs within respective time intervals with the predetermined time granularity.

As an example, the unit time is minute and the consumed throughputs are thus obtained per minutes. Where the time granularity to select target consumed throughputs is hour, there are 60 consumed throughputs within the time granularity. The TOL 300 may identify a consumed throughput having the maximum throughput value among the 60 consumed throughputs and take this consumed throughput as the target consumed throughput for the hour.

Subsequently, the TOL 300 may determine a statistical throughput consumption value from the target consumed throughputs (316). In an implementation, the statistical throughput consumption value is greater than consumed throughput values of a predetermined portion of the target consumed throughputs. For example, the TOL 300 may determine the statistical throughput consumption value as a Nth percentile consumed throughput value of the target consumed throughputs and calculate the Nth percentile consumed throughput value at the percentile calculator 436. In some implementations, the Nth percentile is greater than or equal to 95th percentile. Here, the percentile value of the target consumed throughputs may present deeper insights into the distribution of the utilization curve of the database service as opposed to the average value of the target consumed throughputs.

For example, a database service is considered underutilized when the provisioned throughput for the user contracting for the database service is higher than the throughput actually consumed by the user. As such, the TOL 300 may need to downsize the provisioned throughput. In the example, historical consumed throughputs of the database service reveal that 95% of the consumed throughputs are 10 RUs while 5% of the consumed throughputs are 100 RUs.

As such, the 95th percentile consumed throughput value is 10 RUs, which is less than the averaged consumed throughput value 14.5 RUs. Thus, the resulting provisioned throughput downsized based on the 95th percentile value may be less than the resulting provisioned throughput downsized based on the averaged value. That said, percentile statistics may help downsize the provisioned throughput more than average statistics. This may help improve the overall utilization of the database service. For another example, the database service may have unacceptably high consumed throughputs, i.e., outliers. Such outliers may be identified only through a higher percentile calculation, for example, when the outliers are in the 98th or 99th percentile of consumed throughputs. Thus, in order to take into account the outliers, the throughput optimization analysis needs to introduce percentile statistics.

After determining the statistical throughput consumption value, the TOL 300 may calculate the statistics-based throughput over the TPO interval for the target database service based on the statistical throughput consumption value (317). For example, the TOL 300 may calculate a 99th percentile consumed throughput value from the target consumed throughputs and calculate the statistics-based throughput as equal to the 99th percentile consumed throughput value. For another example, the TOL 300 may calculate the statistics-based throughput as equal to the statistical throughput consumption value plus a predetermined percentage buffer.

The TOL 300 may output the statistics-based throughput results for individual target database services to the data accumulator 434. At the accumulator enabler 436, the TOL 300 may monitor if all of the target database services have been evaluated at the throughput statistical evaluation logic block 430.

At the throughput selection logic block 440, the TOL 300 may extract database service performance metric data for each unit time from the pre-processed utilization tracking data 215 via the data-staging layer 205 (318) and select target performance metric data from the database service performance metric data based on the predetermined time granularity (319). For example, each of the target performance metric data has a maximum performance metric value among database service performance metric data within respective time intervals with the predetermined time granularity.

In an implementation, the database service performance metric data may include the rate limited request records, the error rate records, and the throughput failed request records. Accordingly, the TOL 300 may select target rate limited request records from the rate limited request records. Each of the target rate limited request records has a maximum rate limited request value among rate limited request within respective time intervals with the predetermined time granularity. The TOL 300 may select target error rate records from the error rate records. Each of the target error rate records has a maximum error rate value among error rate records within respective time intervals with the predetermined time granularity. The TOL 300 may select target throughput failed request records from the throughput failed request records. Each of the target throughput failed request records has a maximum throughput failed request value among throughput failed request records within respective time intervals with the predetermined time granularity.

Then, the TOL 300 may determine a statistical performance metric value from the target performance metric data at the throughput weightage selector 442 (320). The statistical performance metric value may be greater than performance metric values of a predetermined portion of the target performance metric data. For example, the TOL 300 may determine the statistical performance metric value as a Nth percentile performance metric values of the target performance metric data. In an implementation, the Nth percentile may be greater than or equal to a 95th percentile.

Where the target performance metric data includes target rate limited request records, the TOL 300 may determine the target rate limited request value as a Nth percentile rate limited request value of the target rate limited request records. Where the target performance metric data includes target error rate records, the TOL 300 may determine the target error rate value as a Nth percentile error rate value of the target error rate records. Where the target performance metric data includes target throughput failed request records, the TOL 300 may determine the target throughput failed request value as a Nth percentile rate limited request value of the target throughput failed request records.

In the example, the TOL 300 may respectively calculate a 99th percentile rate limited request value, a 99th percentile error rate value, a 99th percentile throughput failed request value. Take calculating 99th percentile rate limited request value as example, the TOL 300 may obtain historical rate limited request records of the database service for each unit time from the pre-processed utilization tracking data 215, for example, via the data-staging layer 205. The unit time may be, for example, second, minute, and hour. Then, the TOL 300 may select target rate limited request records from the historical rate limited request records on the basis of the predetermined time granularity. Each of the target rate limited request records may have a maximum rate limited request value among the historical rate limited request records within respective time intervals with the predetermined time granularity. The rate limited request value may represent the number of rate limited requests recorded within a rate limited request record.

In an example, the unit time is minute and the rate limited request records are thus obtained per minute. Where the time granularity to select target rate limited request records is a specific hour, there will be 60 rate limited request records within the time granularity. The TOL 300 may identify a rate limited request record having the maximum rate limited request value among the 60 rate limited request records and take the identified rate limited request record as the target rate limited request record for the hour. For instance, within a specific hour, the 60 rate limited request records indicate that there are 2 rate limited requests in each of the first 59 minutes and there are 3 rate limited requests in the 60th minute. As such, the rate limited request record of the 60th minute would be identified as the target rate limited request record for the specific hour.

Subsequent to obtaining the target rate limited request records, the TOL 300 may calculate a 99th percentile rate limited request value from the target rate limited request records. For example, among 100 target rate limited request records, the rate limited request values out of 99 target rate limited request records are less than or equal to 2. Then, the 99th percentile rate limited request value would be 2.

The 99th percentile error rate value and the 99th percentile throughput failed request value can be calculated in the similar way. With respect to calculating the 99th percentile throughput failed request value, the TOL 300 may obtain historical throughput failed request records of the database service for each unit time from the pre-processed utilization tracking data 215, for example, via the data-staging layer 205. Then, the TOL 300 may select target throughput failed request records from the historical throughput failed request records on the basis of the predetermined time granularity. Each of the target throughput failed request records has a maximum throughput failed request value among the historical throughput failed request records within respective time intervals with the predetermined time granularity. The throughput failed request value may represent the number of the throughput failed requests recorded within a throughput failed request record. Subsequently, the TOL 300 may calculate the 99th percentile throughput failed request value from the target throughput failed request records. Alternatively, the TOL 300 may calculate a throughput failure ratio as the 99th percentile throughput failed request value divided by the 99th percentile consumed throughput value.

With respect to calculating the 99th percentile error rate value, the TOL 300 may obtain historical error rate records of the database service for each unit time from the pre-processed utilization tracking data 215, for example, via the data-staging layer 205. Then, the TOL 300 may select target error rate records from the historical error rate records on the basis of the predetermined time granularity. Each of the target error rate records has a maximum error rate value among the historical error rate records within respective time intervals with the predetermined time granularity. The error rate value may represent the number of the errors recorded within an error rate record. Subsequently, the TOL 300 may calculate a 99th percentile error rate value from the target error rate records. Alternatively, the TOL 300 may calculate an error rate ratio as the 99th percentile error rate value divided by the 99th percentile consumed throughput value.

At the accuracy weightage evaluator 444, the TOL 300 may evaluate the prediction accuracy of the prediction engine 422 (322). For example, the TOL 300 may input a sample utilization tracking data to the prediction engine 422, execute the prediction engine 422 to output a prediction result based on the sample utilization tracking data, and then compare the prediction result with an expected result to determine the prediction accuracy of the prediction engine 422.

The TOL 300 then may select one of the prediction-based throughput obtained at the throughput prediction logic block 420 and the statistics-based throughput obtained at the throughput statistical evaluation logic block 430 as a recommended throughput based on the statistical performance metric value and the performance metric threshold. Where the statistical performance metric value is the 99th percentile rate limited request value, the performance metric threshold may be a rate limited request threshold. Where the statistical performance metric value is the 99th percentile error rate value, the performance metric threshold may be an error rate threshold. Where the statistical performance metric value is the 99th percentile throughput failed request value, the performance metric threshold may be a throughput failed request threshold. In an implementation, the TOL 300 may configure the rate limited request threshold, the throughput failed request threshold, and the error rate threshold at the configuration layer 220 as discussed above.

In an example, upon obtaining the 99th percentile rate limited request value, the 99th percentile error rate value, the 99th percentile throughput failed request value, and the prediction accuracy, the TOL 300 may compare these metric values with corresponding preconfigured metric thresholds including the rate limited request threshold, the error rate threshold, the throughput failed request threshold, and the prediction accuracy.

Where the 99th percentile rate limited request value is less than or equal to the rate limited request threshold, the 99th percentile error rate value is less than or equal to the error rate threshold, the 99th percentile throughput failed request value is less than or equal to the throughput failed request threshold, and the prediction accuracy is greater than an accuracy threshold, the TOL 300 may determine the prediction-based throughput obtained at the throughput prediction logic block 420 as the recommended throughput for the database service. By contrast, where the 99th percentile rate limited request value is less than or equal to the rate limited request threshold, the 99th percentile error rate value is less than or equal to the error rate threshold, the 99th percentile throughput failed request value is less than or equal to the throughput failed request threshold, and the prediction accuracy is less than or equal to the accuracy threshold, the TOL 300 may determine statistics-based throughput obtained at the throughput statistical evaluation logic block 430 as the recommended throughput for the database service.

Alternatively or additionally, the TOL 300 may determine the recommended throughout for the database service based on the 99th percentile rate limited request value, the throughput failure ratio, the error rate ratio, and the prediction accuracy. For example, where the 99th percentile rate limited request value is less than or equal to the rate limited request threshold, e.g., 2, the error rate ratio is less than or equal to an error rate ratio threshold, e.g., 5%, the throughput failure ratio is less than or equal to the throughput failed request threshold, e.g. 5%, and the prediction accuracy is greater than the accuracy threshold, e.g. 85%, the TOL 300 may determine the prediction-based throughput obtained at the throughput prediction logic block 420 as the recommended throughput for the database service. Where the 99th percentile rate limited request value is less than or equal to the rate limited request threshold, the error rate ratio is less than or equal to the error rate ratio threshold, the throughput failure ratio is less than or equal to the throughput failure ratio threshold, and the prediction accuracy is less than or equal to the accuracy threshold, the TOL 300 may determine statistics-based throughput obtained at the throughput statistical evaluation logic block 430 as the recommended throughput for the database service.

Optionally, where neither the prediction-based throughput nor the statistics-based throughput is determined as the recommended throughput, the TOL 300 may calculate an average provisioned throughput from the provisioned throughputs, for example, in the past 90 days. Then, the TOL 300 may add a provisioned buffer to the average provisioned throughput to obtain a buffered provisioned throughput. For example, the provisioned buffer is a predetermined percentage, such as 10%, of the average provisioned throughput. As such, the TOL 300 may determine the buffered provisioned throughput as the recommended throughput.

Likewise, the TOL 300 may add a throughput buffer to the prediction-based throughput/the statistics-based throughput as the recommended throughput at the buffer adder 446. In an implementation, the TOL 300 may select target provisioned throughputs from the provisioned throughputs based on a predetermined time granularity. Each of the target provisioned throughputs has a maximum provisioned throughput value among provisioned throughputs within respective time intervals with the predetermined time granularity. Here, the target provisioned throughput selection is similar to the target consumed throughput selection at the statistical evaluator 422. As an example, the unit time is minute and thus the provisioned throughputs are obtained per minute. Where the time granularity to select target provisioned throughputs is hour, there are 60 provisioned throughputs within the time granularity. The TOL 300 may identify a provisioned throughput having the maximum throughput value among the 60 provisioned throughputs and take this provisioned throughput as the target provisioned throughput for the hour.

The TOL 300 may calculate, for example, a 99th percentile provisioned throughput value from the target provisioned throughputs, which is similar to calculating the 99th percentile consumed throughput value at percentile calculator 433. Next, the TOL 300 may calculate a throughput consumption ratio based on the 99th percentile provisioned throughput value and the 99th percentile consumed throughput value. For example, the throughput consumption ratio is calculated as the 99th percentile provisioned throughput value divided by the 99th percentile consumed throughput value.

The TOL 300 may determine the throughput buffer to be added for the prediction-based throughput/the statistics-based throughput based on the throughput consumption ratio. In an implementation, if the throughput consumption ratio is less than or equal to a predetermined throughput consumption threshold $\pi$, e.g., $1<\pi<1.1$, the TOL 300 may add a higher buffer percentage, e.g., 10%, to the prediction-based throughput/the statistics-based throughput. Otherwise, the TOL 300 may add a lower buffer percentage, e.g., 5%, to the prediction-based throughput/the statistics-based throughput.

Optionally, the execution environment 400 may further include a savings calculator 452. At the savings calculator 452, the TOL 300 may generate a consumption optimization preview for the database service based on the recommended throughput, the average provisioned throughput, a provisioned database service storage volume of the database service, an actually used database service storage volume of the database service, a number of regions in which the database service is distributed, and consumption metrics data for the database service. The consumption optimization preview may demonstrate potential cost savings because of the recommended throughput optimization. The TOL 300 may obtain the provisioned database service storage volume of the database service, the actually used database service storage volume of the database service, the number of regions of the database service, for example, at the input layer 210 via data staging layer 205.

For example, the TOL 300 may calculate the pre-optimization cost of the provisioned throughputs and the post-optimization cost of the recommended throughput, and thereby obtaining the potential savings benefiting from the recommended throughput optimization by subtracting the post-optimization cost from the pre-optimization cost. When calculating the pre-optimization cost, the provisioned throughputs may be represented by the average provisioned throughput. As such, the potentially saved throughput would be the recommended throughput minus the average provisioned throughput. The TOL 300 may calculate the potential savings based on the potentially saved throughputs.

Optionally, the provisioned database service storage volume on the database service may be downsized to a recommended database service storage volume. For example, the TOL 300 may calculate a database service storage volume usage ratio by dividing the provisioned database service storage volume by actually consumed database service storage volume. If the database service storage volume usage ratio is greater than or equal to a predetermined usage ratio threshold, e.g., 1.5, the recommended database service storage volume may be determined as actually consumed database service storage volume plus a percentage buffer, e.g., 10% buffer. Otherwise, the provisioned database service storage volume may not be downsized. If the provisioned database service storage volume of the database service is downsized, the potential cost savings due to database service storage volume downsizing may be included to the consumption optimization preview.

Generally, the more the potential savings are, the higher priority that the database service should be optimized. For example, for the database services undergoing the throughput optimization analysis, the TOL 300 may sort their potential savings in descending order and calculate cumulative saving percentages incrementally for each of the database services in the descending order.

As an example, if the cumulative savings percentage for a database service is less than or equal to 65%, the optimization priority for the database service is set to be high. If the cumulative savings percentage for a database service is less than or equal to 85% but greater than 65%, the optimization priority for the database service is set to be medium. If the cumulative savings percentage for a database service is greater than 85%, the optimization priority for the database service is set to be low.

For purpose of illustration, the TOL 300 may execute the example routines in Table 1 to implement functions of the prescriptive engine layer 250 in individual modules of the execution environment 400.

TABLE 1

Example Routine for prescribing throughput optimization

| | Description |
|---|---|
| Example Routine | Algorithm formula:<br>Equation 1a - Predicted Throughputs<br>$\epsilon$ = If [($\lambda$(t) <= $\delta$) AND ($\zeta$(t) <= X) AND ($\Psi$(t) <= $\rho$) AND ($\sigma$ > $\varkappa$)], THEN $\Omega$ ELSE $\tau$<br>$\Omega$ = If ( $\alpha$ <= $\pi$, THEN [($\gamma$(n) + $\gamma$(n)*$\varrho$)] ELSE [($\gamma$(n) + $\gamma$(n)* $\beta$)])<br>Equation 1b - Statistical Throughputs<br>$\epsilon$ = If [($\lambda$(t) <= $\delta$) AND ($\zeta$(t) <= X) AND ($\Psi$(t) <= $\rho$) AND ($\sigma$ <= $\varkappa$)], THEN $\Omega$ ELSE $\tau$<br>$\Omega$ = If ( $\alpha$ <= $\pi$, THEN [($\epsilon$(t) + $\epsilon$(t)* $\varphi$) ELSE [($\epsilon$(t)+ $\epsilon$(t)* $\sigma$)])<br>where,<br>$\epsilon$ = Throughput Provisioning Condition<br>$\tau$ = $\xi$(t) + $\xi$(t)* $\Phi$ ($\tau$ would be iteratively increased until $\lambda$(t), $\zeta$(t) and ($\psi$(t) are within the thresholds)<br>$\xi$(t) = Average Provisioned Throughput for the past "t" days<br>$\Omega$ = Throughput Provisioning Magnitude<br>$\alpha$ = Throughput Consumption Ratio = $\omega$(t)/ $\epsilon$(t)<br>$\omega$(t) = 99th percentile of the provisioned throughput for the past "t" days |

TABLE 1-continued

Example Routine for prescribing throughput optimization

Description $\varepsilon(t)$ = 99th percentile of the consumed throughput for the past "t" days
$\Phi$ = Higher Buffer (~10%) & $\sigma$ = Lower Buffer (~5%)
$\pi$ = Throughput consumption threshold, e.g., $1 < \pi < 1.1$
$\gamma(n)$ = Predicted Throughput for the next "n" days
$\varrho$ = Higher Buffer on Predicted Throughput
$\beta$ = Lower Buffer on Predicted Throughput
$\lambda(t)$ = 99th percentile of "Rate Limited Requests" for the past "t" days
$\delta$ = Threshold for $\lambda(t)$ such that $\delta < \gamma$ (Typically $\gamma$ = 2)
$\zeta(t)$ = 99th percentile of "Throughput Failed Requests" for the past "t" days
x = Threshold for $\zeta(t)$ such that $x < \Sigma$ (Typically $\Sigma$ = 5%)
$\Sigma$ = As a percentage of "Consumed Requests for the past t days"
$\Psi(t)$ = 99th percentile of "Error Rate" for the past "t" days
$\rho$ = Threshold for $\Psi(t)$ such that $\rho < \theta$ (Typically $\theta$ = 5%)
$\theta$ = As a percentage of "Consumed Requests for the past t days"
$\eth$ = Prediction Accuracy of the Deep Learning Algorithm on the Test Data
$\mathcal{H}$ = Business Relevant Cut-Off (Usually 85%)
Savings Calculator:
Cost Savings = $\mho * Y * ((\xi(t) - \Omega)/100) + (((A-B)*C)*X)$
Where,
$\mho$ = Price/100 RUs for single/multiple regions
Y = Number of hours in the current month
$\xi(t)$ = Average Provisioned Throughput for the past "t" days
$\Omega$ = Throughput Provisioning Magnitude
A = Provisioned Volume
B = Recommended Volume
C = Storage Cost/GB (typically $0.25 per month)
X = Number of Regions Note:
$\mho$ = IF(X >1, (X + 1)*ø, $\acute{e}$)
Where: ø = $0.016 and $\acute{e}$ = $0.008
B = (IF (A/Z)>=1.5 (Z + Z*0.1) ELSE A)
Where: Z = Actual Volume Used (GB)

Optionally, upon determining to execute a throughput optimization for the database service, the TOL 300 may output its optimization recommendations as a TPO token 252. The prescriptive engine layer 250 may send the TPO token 252 to a host interface for management of the database services. For example, the TPO token may, for example, include a logic rightsizing the throughput provisioned for the target database service. The host interface may include an Application Programming Interface (API) for rightsizing the provisioned throughput for a database service and execute the TPO token with the API to right size the throughput provisioned for the target database service.

Optionally, the TOL 300 may execute the similar operations at the prescriptive engine layer 250 to output respective throughput optimization recommendations for each of the database services undergoing the throughput optimization analysis. Upon the throughput optimization recommendations are output, the TOL 300 then may, at the prescriptive engine layer 250, store the throughput optimization recommendations via a memory operation at the data staging layer 205 (326).

Now referring to the presentation layer 260 in FIG. 2, where the TOL 300 may access the optimization recommendations from the prescriptive engine layer 250, e.g., via data staging layer 205 memory operations to generate a TPO-control interface 266 including a TPO-window presentation 268 (328).

Figure 6:
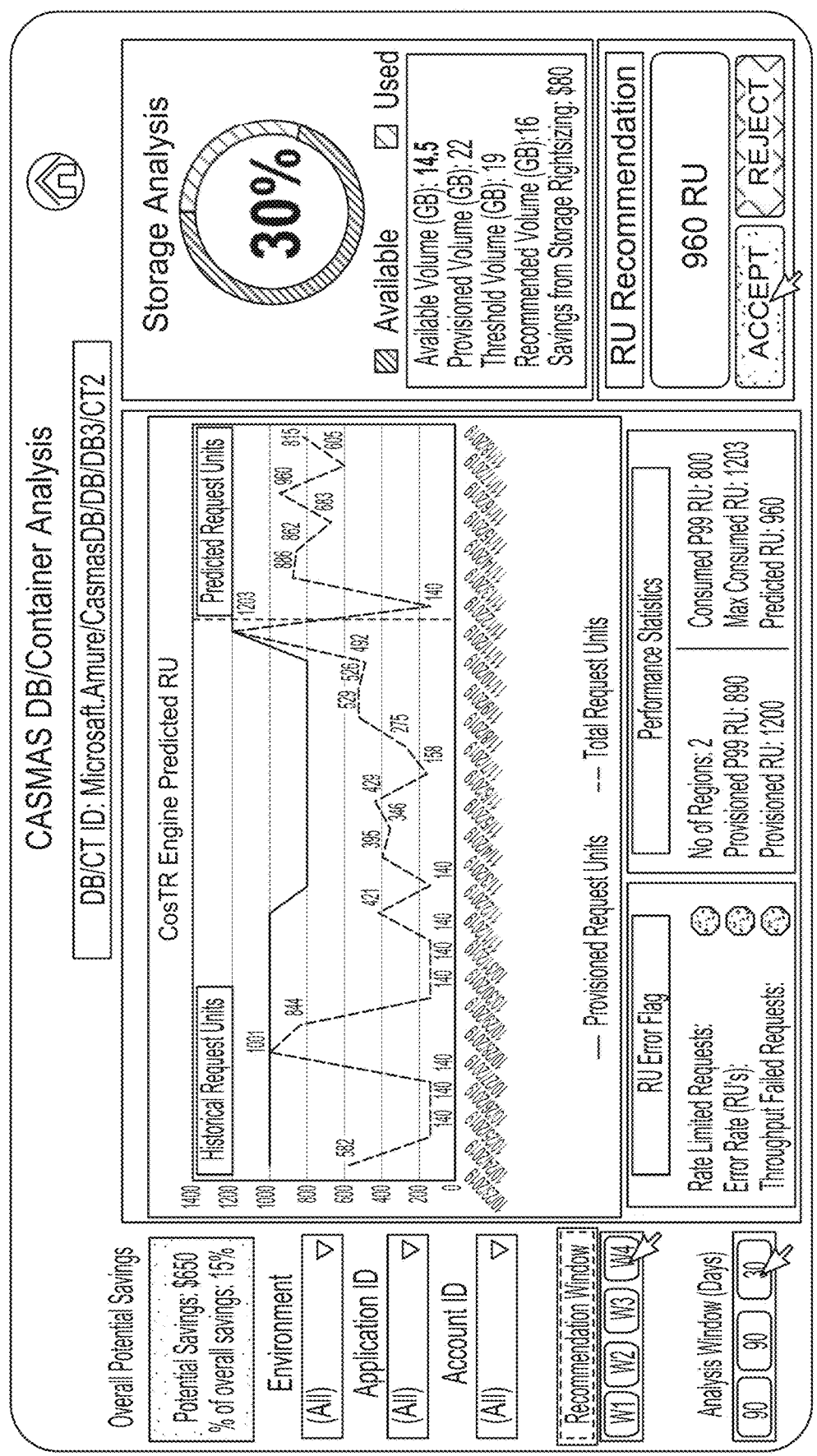
FIG. 6 shows a second example throughput optimization control interface.

The TPO-window presentation 268 may include data and/or selectable options related to the optimization recommendations. In an implementation, the TPO-window presentation 268 may be configured to display prescriptive analysis information with regard to the throughput optimization. For example, FIGS. 5A-5D illustrate an example of the throughput optimization analysis preview by database service including, for example, the database/container throughput recommendation and potential savings. It may also illustrate the throughput optimization priority for the database services in accordance with their potential savings. FIG. 6 illustrates an example of a detailed throughput optimization analysis for a specific database including, for example, the historical provisioned/consumed throughputs, the predicted throughputs preview for the database, the provisioned/recommended database service storage volume of the database, and the optimization recommendations for this database.

Further, an option to forward a TPO token, to a host interface for throughput rightsizing in accord the recommendations may be included as one of the selectable options available through the TPO-window presentation 268. Alternatively or additionally, an option to configure the TPO interval and the time length of the utilization tracking data 212 used for the throughput optimization analysis may be included as a portion of the selectable options available through the TPO-window, as illustrated in FIG. 6. Additionally or alternatively, the TPO-window presentation 268 may include options for the operator to input various performance metric thresholds.

Figure 7:
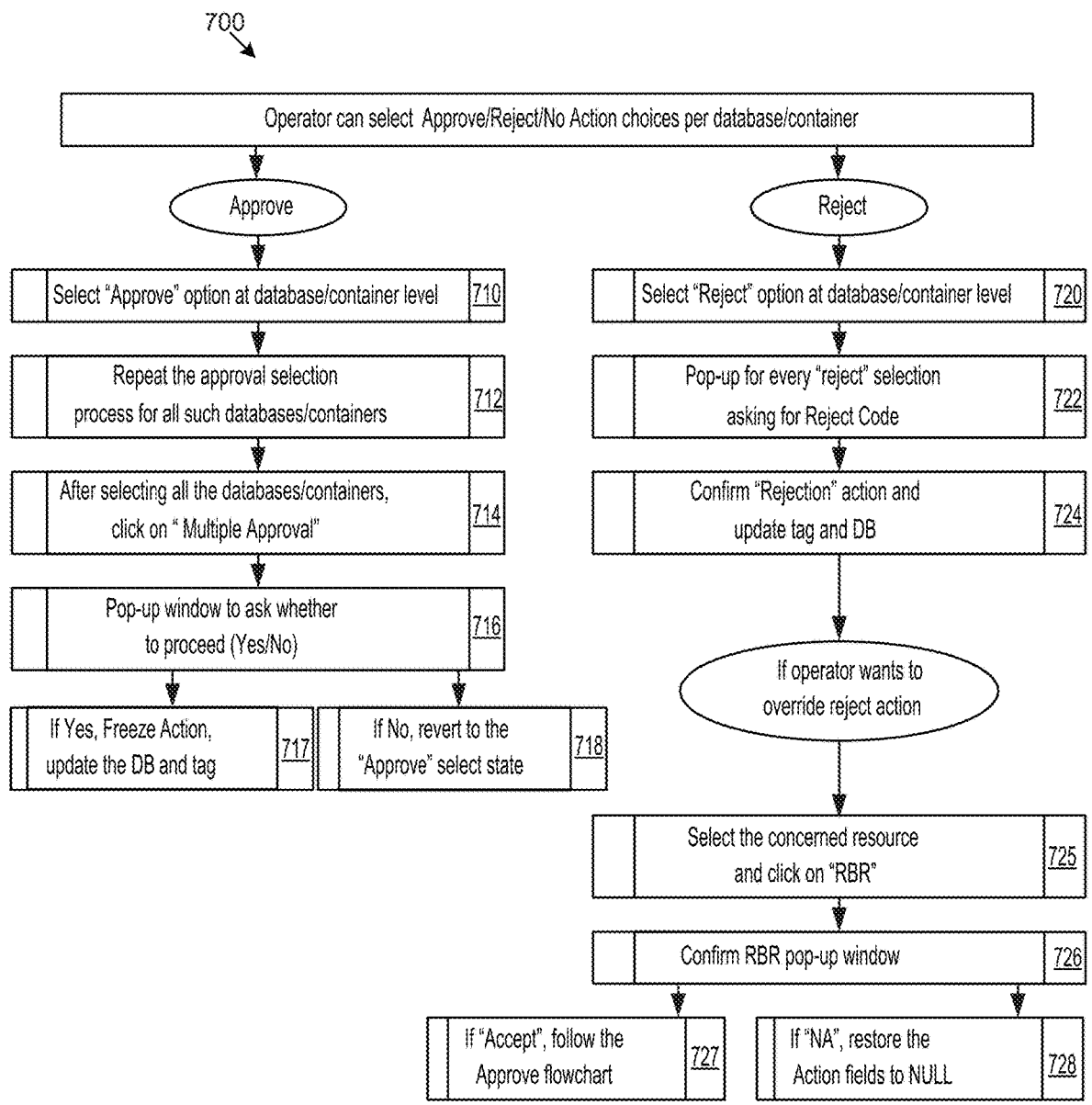
FIG. 7 shows an example interaction logic with a throughput optimization control interface in accordance with an embodiment.

Additionally or alternatively, the TPO-window presentation may include an option to approve/reject one or more (or all of) the throughput optimization recommendations. FIG. 7 shows an example interaction logic between the operator and the TPO-window presentation 268 to approve/reject the displayed optimization recommendations. Specifically, the operator may take approval/rejection action per database service in the TPO-window presentation 268.

For example, the TPO-window presentation 268 may include "Approve," "Reject," and "No action" options for each of the databases/containers. The operator may select "Approve" option at database/container level (710) and repeat the "Approve" selection for other databases/containers (712). After finishing the option selections for all the databases/containers, the operator may click on "Multiple Approval" option (714). As response, the TPO-window presentation 268 may pop-up a window to ask the operator to confirm to proceed with "Yes" and/or "No" options (716). If the operator selects "Yes" option, the TPO-window presentation 268 may freeze action in the window and update the operator's inputs in the background storage storing the inputs (717). If the operator selects "No" option, the TPO-window presentation 268 may revert to the "Approve" selection state (718).

The operator may also select "Reject" option at database/container level (720). For each "Reject" selection, the TPO-window presentation 268 may pop up a window to ask for a rejection code justifying the rejection (722). Where the rejection code is verified, the TPO-window presentation 268 may confirm the rejection action and update the operator's inputs in the background database service (724).

Optionally, if the operator would like to override his/her previous rejection action, the operator may select the concerned database services and click "RBR" option (725). As response, the TPO-window presentation 268 may pop up a window to confirm the "RBR" selection with "Accept" and "NA" options (726). If the operator selects "Accept" option, the TPO-window presentation 268 may enable to select the "Approve" option for the concerned database services (727). If the operator selects "NA", the TPO-window presentation 268 may nullify all the selection actions with respect to the concerned database services (728).

Through the interaction with the operator via the TPO-control interface, the TOL 300 may perform a throughput determination on whether to execute, based on the recommended throughput, a throughput optimization for the target database service (329). Where the TOL 300 determines to execute the throughput optimization, the TOL 300 may generate a TPO token 252 based on the recommended throughput (330). The TPO token may, for example, include a logic rightsizing the throughput provisioned for the target database service.

Optionally, similar to the throughput determination, the TOL 300 may perform a storage volume determination on whether to execute a storage volume optimization for the target NoSQL database service based on the recommended database service storage volume. Where the TOL 300 determines to execute the storage volume optimization, the TOL 300 may generate the TPO token 252 based on both the recommended throughput and the recommended database service storage volume. The TPO token may, for example, include a logic right sizing both the throughput and the storage volume provided for the target database service.

After generation of the TPO token 252, the TOL 300 may initiate deployment of the TPO token 252 by causing network interface circuitry (e.g., the communication interfaces 812) to send the TPO token 252 to a host interface for throughput optimization (332). For example, services such as Amazon® Web Services (AWS), Cloudian®, Microsoft® Azure, or other cloud computing services, may maintain host interfaces (e.g., web interfaces, application programming interfaces, or other interfaces) by which cloud user/system operator may manage the database services.

In some cases, the TOL 300 may initiate deployment via the data export layer 270. The data export layer 270 may format the reservation matrix in one or more formats for transfer. For example, the data export layer 270 may support format translation to java script object notation (JSON), extensible markup language (XML), comma separated value (CSV), Tableau Workbook (TBWX), hypertext markup language (HTML) or other formats. The data export layer 270 may also support transfer of the TPO token in one or more states, such as flat file transfers, streaming transfers, web service access, internet protocol transfers, or other transfers. Additionally or alternatively, the TOL 300 may initiate deployment via the prescriptive engine layer 250 through direct transfer, direct network access, or other non-export transfer.

Figure 8:
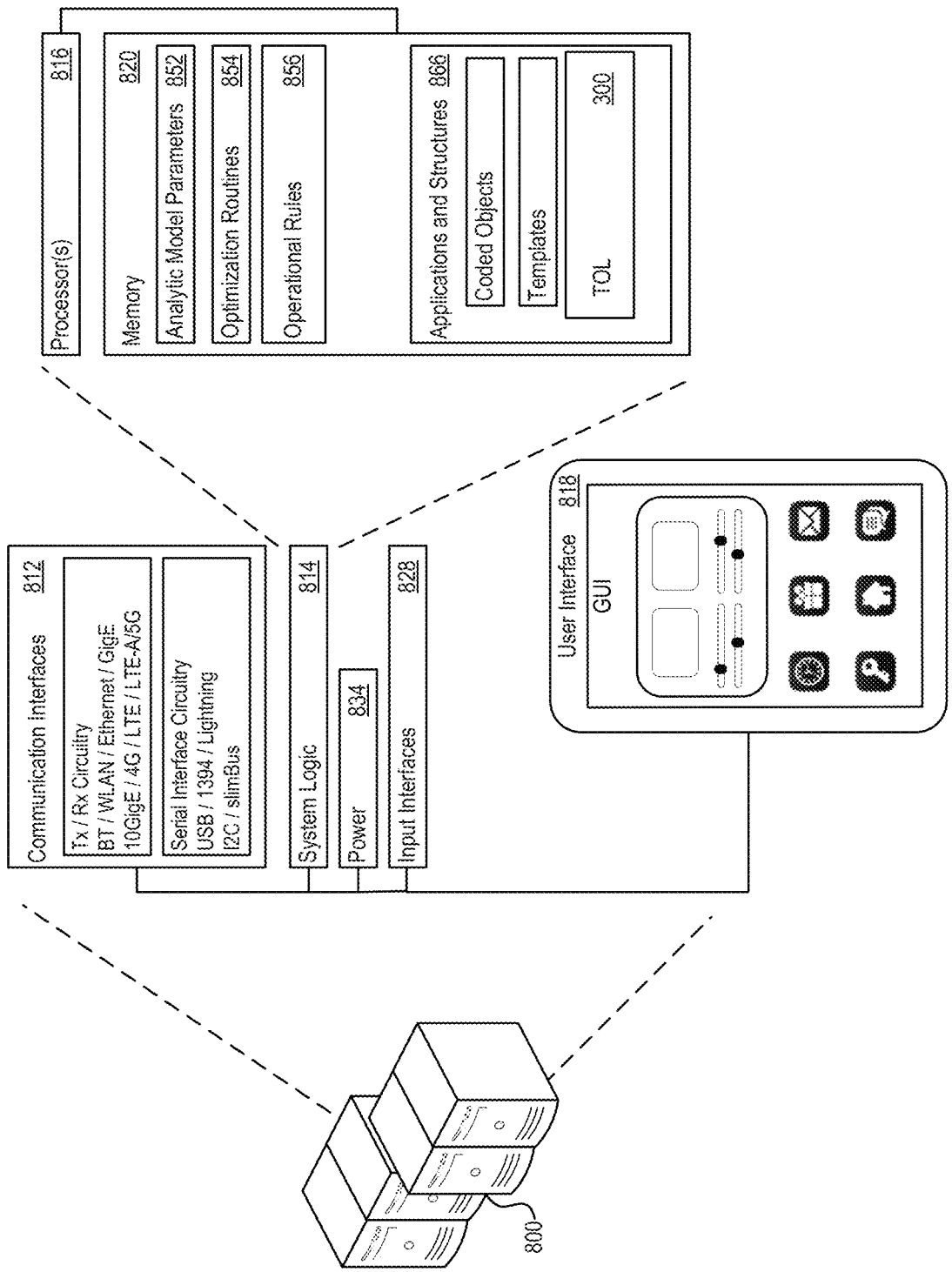
FIG. 8 shows an example system execution environment for the throughput optimization stack.

FIG. 8 shows an example system execution environment 800 for the TPO stack 200 described above. The execution environment 800 may include system logic 814 to support execution of the multiple layers of TPO stack 200 described above. The system logic may include processors 816, memory 820, and/or other circuitry.

The memory 820 may include analytic model parameters 852, optimization routines 854, and operational rules 856. The memory 820 may further include applications and structures 866, for example, coded objects, machine instructions, templates, or other structures to support pre-processing the utilization tracking data, predicting database service throughputs, evaluating statistical database service throughputs, or other tasks described above. The applications and structures may implement the TOL 300.

The execution environment 800 may also include communication interfaces 812, which may support wireless, e.g. Bluetooth, Wi-Fi, WLAN, cellular (4G, LTE/A, 5G), and/or wired, Ethernet, Gigabit Ethernet, optical networking protocols. The communication interfaces 812 may also include serial interfaces, such as universal serial bus (USB), serial ATA, IEEE 1394, lighting port, I$^2$C, slimBus, or other serial interfaces. The communication interfaces 812 may be used to support and/or implement remote operation of the TPO-control interface 266. The execution environment 800 may include power functions 834 and various input interfaces 828. The execution environment may also include a user interface 818 that may include human-to-machine interface devices and/or graphical user interfaces (GUI). The user interface 818 may be used to support and/or implement local operation of the TPO-control interface 266. In various implementations, the system logic 814 may be distributed over one or more physical servers, be implemented as one or more virtual machines, be implemented in container environments such as Cloud Foundry or Docker, and/or be implemented in Serverless (functions as-a-Service) environments.

In some cases, the execution environment 800 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the TPO stack 200, of the execution environment onto the hardware resources. In some cases, a manifest may be stored as a preference file such as a YAML (yet another mark-up language), JSON, or other preference file type. Additionally or alternatively, the manifest may include custom scripts to implement the TPO stack 200 in a serverless environment, for example, using the multiple-tier multiple-node serverless framework described in U.S. patent application Ser. No. 16/159,399, filed 12 Oct. 2018, and entitled Distributed Multiple Tier Multi-Node Serverless Framework for Complex Analytics Task Execution, which is incorporated by reference herein in its entirety. Therein, a multiple-tier framework is described. The framework describes a series of the serverless tasks controlled via scripts. The serverless tasks overlap in execution to maintain continuity across the tasks. The computational task in divided into chunks that may be handled by individual serverless tasks. Accordingly, a complex analytic process, such as those describe in this disclosure, may be divided into chunks and executed over one or more overlapping serverless tasks.

The methods, devices, processing, circuitry, and logic described above may be implemented in many different ways and in many different combinations of hardware and software. For example, all or parts of the system, including the network interface circuitry and the optimization circuitry, may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible database service medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a database service medium and instructions stored in or on the medium, and the instructions when executed by the circuitry in a device may cause the device to implement any of the processing described above or illustrated in the drawings.

Implementations of the system may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include standalone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system comprising:
a host interface;
network interface circuitry configured to:
   receive utilization tracking data for a target NoSQL database service provisioned with provisioned throughputs, a provisioned throughput representing a capacity of the target NoSQL database service to process data per unit time; and
   send a throughput optimization (TPO) token to the host interface;
optimization circuitry in data communication with the network interface circuitry, the optimization circuitry configured to execute a TPO stack, the TPO stack executable to:
   at a prescriptive engine layer of the TPO stack:
      obtain consumed throughputs for each unit time from the utilization tracking data;
      predict, based on the consumed throughputs, a prediction-based throughput over a TPO interval for the target NoSQL database service with a prediction engine, the prediction engine comprising a machine learning model trained to predict throughput of a NoSQL database service;
      select target consumed throughputs from the consumed throughputs based on a predetermined time granularity;
      determine a statistical throughput consumption value from the target consumed throughputs, wherein the statistical throughput consumption value is greater than consumed throughput values of a predetermined portion of the target consumed throughputs;
      calculate a statistics-based throughput over the TPO interval for the target NoSQL database service based on the statistical throughput consumption value;
      extract database service performance metric data for each unit time from the utilization tracking data;
      select target performance metric data from the database service performance metric data based on the predetermined time granularity;
      determine a statistical performance metric value from the target performance metric data, wherein the statistical performance metric value is greater than performance metric values of a predetermined portion of the target performance metric data;
      select one of the prediction-based throughput and the statistics-based throughput as a recommended throughput based on the statistical performance metric value, a performance metric threshold, and a prediction accuracy of the prediction engine;
      perform a throughput determination to execute a throughput optimization for the target NoSQL database service based on the recommended throughput; and
      generate the TPO token based on the throughput determination; and
the host interface being configured to provision the target NoSQL database service with the recommended throughput by executing the TPO token.

2. The system of claim 1, wherein the optimization circuitry is configured to:

determine the statistical throughput consumption value as a Nth percentile consumed throughput value of the target consumed throughputs; and determine the statistical performance metric value as a Nth percentile performance metric value of the target performance metric data;

wherein the Nth percentile is greater than or equal to a 95th percentile.

3. The system of claim 1, wherein the target performance metric data comprises rate limited request records, error rate records, and throughput failed request records, and the optimization circuitry is configured to:

calculate a Nth percentile rate limited request value from the rate limited request records, a Nth percentile error rate value from the error rate records, and a Nth percentile throughput failed request value from the throughput failed request records; and select one of the prediction-based throughput and the statistics-based throughput as the recommended throughput based on at least one of the Nth percentile rate limited request value, the Nth percentile error rate value, the Nth percentile throughput failed request value, and a prediction accuracy of the prediction engine.

4. The system of claim 3, wherein the optimization circuitry is configured to select the prediction-based throughput as the recommended throughput in response to the Nth percentile rate limited request value being less than or equal to a rate limited request threshold, the Nth percentile error rate value being less than or equal to an error rate threshold, the Nth percentile throughput failed request value being less than or equal to a throughput failed request threshold, and a prediction accuracy being greater than an accuracy threshold.

5. The system of claim 4, wherein the optimization circuitry is configured to select the statistics-based throughput as the recommended throughput in response to the Nth percentile rate limited request value being less than or equal to the rate limited request threshold, the Nth percentile error rate value being less than or equal to the error rate threshold, the Nth percentile throughput failed request value being less than or equal to the throughput failed request threshold, and the prediction accuracy being less than or equal to the accuracy threshold.

6. The system of claim 5, wherein the optimization circuitry is configured to:

in response to neither the prediction-based throughput nor the statistics-based throughput being selected as the recommended throughput,
  calculate an average provisioned throughput from the provisioned throughputs,
  add a provisioned buffer to the average provisioned throughput to obtain a buffered provisioned throughput, and
  select the buffered provisioned throughput as the recommended throughput.

7. The system of claim 6, wherein the optimization circuitry is further configured to generate a consumption optimization preview for the target NoSQL database service based on the recommended throughput, the average provisioned throughput, and consumption metrics data for the target NoSQL database service.

8. The system of claim 7, wherein the optimization circuitry is further configured to determine a priority to execute the throughput optimization for the target NoSQL database service based on the consumption optimization preview.

9. The system of claim 1, wherein the optimization circuitry is further configured to:

select target provisioned throughputs from the provisioned throughputs based on the predetermined time granularity, each of the target provisioned throughputs having a maximum provisioned throughput value among provisioned throughputs within respective time intervals with the predetermined time granularity;

calculate a Nth percentile provisioned throughput value from the target provisioned throughputs;

calculate a throughput consumption ratio based on the Nth percentile provisioned throughput value and the statistical throughput consumption value;

determine a prediction-based throughput buffer to add to the prediction-based throughput based on the throughput consumption ratio;

add the prediction-based throughput buffer to the prediction-based throughput to obtain a first buffered throughput;

determine a statistics-based throughput buffer to add to the statistics-based throughput based on the throughput consumption ratio;

add the statistics-based throughput buffer to the statistics-based throughput to obtain a second buffered throughput; and select one of the first buffered throughput and the second buffered throughput as the recommended throughput based on the statistical performance metric value and a prediction accuracy of the prediction engine.

10. The system of claim 1, wherein:

the TPO stack is further executable to, at a presentation layer of the TPO stack, generate a TPO control interface including a TPO-window presentation; and the TPO-window presentation includes a selectable option to execute the throughput optimization.

11. The system of claim 10, wherein the TPO-window presentation further includes a selectable option to reject execution of the throughput optimization.

12. The system of claim 10, wherein the TPO-window presentation is configured to display multiple throughput optimizations, each of the respective throughput optimizations for a corresponding database service.

13. The system of claim 1, wherein the optimization circuitry is further configured to:

calculate a database service volume usage ratio based on a provisioned database service volume on the target NoSQL database service and a consumed database service storage volume by the target NoSQL database service;

determine a recommended database service storage volume for the target NoSQL database service based on the database service volume usage ratio;

perform a storage volume determination to execute a storage volume optimization for the target NoSQL database service based on the recommended database service storage volume; and generate the TPO token based on the throughput determination and the storage volume determination.

14. The system of claim 1, wherein the prediction engine includes a long short-term memory neural network model trained to predict throughput of the target NoSQL database service.

15. The system of claim 1, wherein the target NoSQL database service is a NoSQL database or a NoSQL container in the NoSQL database.

16. The system of claim 1, wherein the optimization circuitry is further configured to:

select the target NoSQL database service from a plurality
of candidate database services by:
obtaining a utilization time length for a candidate
database service;
obtaining a utilization data missing coefficient for the
candidate database service; and
determination of the candidate database service as the
target NoSQL database service by comparison of the
utilization time length to a utilization time length
threshold and comparison of the utilization data
missing coefficient to a data missing tolerance
threshold.

17. The system of claim 1, wherein each of the target consumed throughputs has a maximum consumed throughput value among consumed throughputs within respective time intervals with the predetermined time granularity and each of the target performance metric data has a maximum performance metric value among database service performance metric data within respective time intervals with the predetermined time granularity.

18. The system of claim 17, wherein the TPO stack is further executable to:
at an input layer of the TPO stack:
obtain, via the network interface circuitry, the utilization tracking data; and
store the utilization tracking data via a database service operation at a data-staging layer of the TPO stack;
at a configuration layer of the TPO stack:
determine the TPO interval; and
determine the performance metric threshold.

19. A method comprising:
receiving, at network interface circuitry, utilization tracking data for a target NoSQL database service provisioned with provisioned throughputs, a provisioned throughput representing a capacity of the target NoSQL database service to process data per unit time;
executing a throughput optimization (TPO) stack with optimization circuitry, the optimization circuitry in data communication with the network interface circuitry, executing the TPO stack comprising:
obtaining, at a prescriptive engine layer of the TPO stack, consumed throughputs for each unit time from the utilization tracking data;
predict, at the prescriptive engine layer, based on the consumed throughputs, a prediction-based throughput over a TPO interval for the target NoSQL database service with a prediction engine, the prediction engine comprising a machine learning model trained to predict throughput of a NoSQL database service;
select, at the prescriptive engine layer, target consumed throughputs from the consumed throughputs based on a predetermined time granularity;
determine, at the prescriptive engine layer, a statistical throughput consumption value from the target consumed throughputs, wherein the statistical throughput consumption value is greater than consumed throughput values of a predetermined portion of the target consumed throughputs;
calculate, at the prescriptive engine layer, a statistics-based throughput over the TPO interval for the target NoSQL database service based on the statistical throughput consumption value;
extract, at the prescriptive engine layer, database service performance metric data for each unit time from the utilization tracking data;

select, at the prescriptive engine layer, target performance metric data from the database service performance metric data based on the predetermined time granularity;
determine, at the prescriptive engine layer, a statistical performance metric value from the target performance metric data, wherein the statistical performance metric value is greater than performance metric values of a predetermined portion of the target performance metric data;
select, at the prescriptive engine layer, one of the prediction-based throughput and the statistics-based throughput as a recommended throughput based on the statistical performance metric value, a performance metric threshold, and a prediction accuracy of the prediction engine;
perform, at the prescriptive engine layer, a throughput determination to execute a throughput optimization for the target NoSQL database service based on the recommended throughput; and
generate, at the prescriptive engine layer, a TPO token based on the throughput determination; and
sending, via the network interface circuitry, the TPO token to a host interface;
provisioning, with the host interface, the target NoSQL database service with the recommended throughput by executing the TPO token.

20. A product including:
machine-readable media other than a transitory signal; and
instructions stored on the machine-readable media, the instructions configured to, when executed, cause a machine to:
at network interface circuitry:
receive utilization tracking data for a target NoSQL database service provisioned with provisioned throughputs, a provisioned throughput representing a capacity of the target NoSQL database service to process data per unit time;
at optimization circuitry in data communication with the network interface circuitry, the optimization circuitry executing a throughput optimization (TPO) stack:
obtain, at a prescriptive engine layer of the TPO stack, consumed throughputs for each unit time from the utilization tracking data;
predict, at the prescriptive engine layer, based on the consumed throughputs, a prediction-based throughput over a TPO interval for the target NoSQL database service with a prediction engine, the prediction engine comprising a machine learning model trained to predict throughput of a NoSQL database service;
select, at the prescriptive engine layer, target consumed throughputs from the consumed throughputs based on a predetermined time granularity;
determine, at the prescriptive engine layer, a statistical throughput consumption value from the target consumed throughputs, wherein the statistical throughput consumption value is greater than consumed throughput values of a predetermined portion of the target consumed throughputs;
calculate, at the prescriptive engine layer, a statistics-based throughput over the TPO interval for the target NoSQL database service based on the statistical throughput consumption value;

extract, at the prescriptive engine layer, database service performance metric data for each unit time from the utilization tracking data;

select, at the prescriptive engine layer, target performance metric data from the database service performance metric data based on the predetermined time granularity;

determine, at the prescriptive engine layer, a statistical performance metric value from the target performance metric data, wherein the statistical performance metric value is greater than performance metric values of a predetermined portion of the target performance metric data;

select, at the prescriptive engine layer, one of the prediction-based throughput and the statistics-based throughput as a recommended throughput based on the statistical performance metric value, a performance metric threshold, and a prediction accuracy of the prediction engine;

perform, at the prescriptive engine layer, a throughput determination to execute a throughput optimization for the target NoSQL database service based on the recommended throughput; and generate, at the prescriptive engine layer, a TPO token based on the throughput determination; and send, via the network interface circuitry, the TPO token to a host interface;

at the host interface:

provision the target NoSQL database service with the recommended throughput by executing the TPO token.

\* \* \* \* \*